US011368005B2

(12) United States Patent
Meine et al.

(10) Patent No.: US 11,368,005 B2
(45) Date of Patent: Jun. 21, 2022

(54) WIRE MANAGEMENT STRUCTURE FOR A RAIL-LESS SOLAR PANEL ASSEMBLY

(71) Applicant: Ironridge, Inc., Hayward, CA (US)

(72) Inventors: Shawn Meine, Phoenix, AZ (US); Jon Ash, Phoenix, AZ (US); David F. Taggart, San Carlos, CA (US); Willie Kim, San Mateo, CA (US); Clayton Robert Rietz, Phoenix, AZ (US); William Anthony Pereira, Phoenix, AZ (US)

(73) Assignee: IronRidge, Inc., Hayward, CA (US)

( * ) Notice: Subject to any disclaimer, the term of this patent is extended or adjusted under 35 U.S.C. 154(b) by 73 days.

(21) Appl. No.: 15/466,922

(22) Filed: Mar. 23, 2017

(65) Prior Publication Data
US 2017/0194902 A1 Jul. 6, 2017

Related U.S. Application Data

(60) Division of application No. 15/140,399, filed on Apr. 27, 2016, now Pat. No. 9,647,433, and a
(Continued)

(51) Int. Cl.
H02S 20/23 (2014.01)
H02G 3/00 (2006.01)
(Continued)

(52) U.S. Cl.
CPC ............ H02G 3/263 (2013.01); F24S 25/33 (2018.05); F24S 25/61 (2018.05); F24S 25/634 (2018.05);
(Continued)

(58) Field of Classification Search
CPC .......... H02S 40/36; H02S 40/34; H02S 40/45; H02S 40/38; H02S 30/10; H02S 20/30; H02S 20/23; H02S 20/20; H02S 20/24; H02S 20/32; H02G 3/263; H02G 3/24; H02G 3/26; H02G 3/28; H02G 3/281; H02G 3/283; H02G 3/285; H02G 3/32;
(Continued)

(56) References Cited

U.S. PATENT DOCUMENTS 4,165,853 A 8/1979 Brandt
6,959,517 B2 11/2005 Poddany et al.
(Continued)

OTHER PUBLICATIONS

Zep Solar (Website)—http://www.zepsolar.com/index.php/products/zs-comp.

Primary Examiner — Jessica L Laux
(74) Attorney, Agent, or Firm — The Webb Law Firm

(57) ABSTRACT

In various representative aspects, an assembly for securing array skirts and solar panel modules in an array on a roof by providing a leveling system that utilizes a barrel bolt and barrel nut to vertically adjust the assembly. Improved electrical bonding by utilizing bonding pins installed in mounting plates of a support clamp are also provided. Additionally, an improved array skirt design that is installed on the outer row of the array, as well as improved designs in the support clamp and splice mechanisms are also provided. Finally, an improved wire management system is included as well as a method of installation of the array assembly.

4 Claims, 35 Drawing Sheets

Related U.S. Application Data continuation-in-part of application No. 14/946,569, filed on Nov. 19, 2015, now Pat. No. 9,800,199.

(60) Provisional application No. 62/153,403, filed on Apr. 27, 2015, provisional application No. 62/081,985, filed on Nov. 19, 2014.

(51) Int. Cl.
| | |
|---|---|
| *F24S 25/61* | (2018.01) |
| *F24S 25/33* | (2018.01) |
| *F24S 25/634* | (2018.01) |
| *F24S 25/613* | (2018.01) |
| *F24S 25/00* | (2018.01) |

(52) U.S. Cl.
CPC ............ *H02S 20/23* (2014.12); *F24S 25/613* (2018.05); *F24S 2025/021* (2018.05); *Y02B 10/10* (2013.01); *Y02B 10/20* (2013.01); *Y02E 10/47* (2013.01)

(58) Field of Classification Search
CPC ........ H02G 3/385; Y02B 10/20; Y02B 10/12; Y02B 10/10; Y02B 10/14; Y02E 10/47
See application file for complete search history.

(56) References Cited

U.S. PATENT DOCUMENTS

| | | | |
|---|---|---|---|
| 7,758,011 B2 | 7/2010 | Haddock | |
| 8,109,048 B2 | 2/2012 | West et al. | |
| 8,181,402 B2 | 5/2012 | Tsuzuki et al. | |
| 8,181,926 B2 | 5/2012 | Magno et al. | |
| 8,245,460 B2 | 8/2012 | Yamanaka et al. | |
| 8,375,654 B1 | 2/2013 | West et al. | |
| 8,453,986 B2 | 6/2013 | Schnitzer | |
| 8,578,666 B2 | 11/2013 | Yen | |
| 8,595,996 B2 | 12/2013 | Korman et al. | |
| 8,683,761 B2 | 4/2014 | Danning | |
| 8,756,881 B2 | 6/2014 | West | |
| 8,806,813 B2 | 8/2014 | Plaisted | |
| 8,938,932 B1 * | 1/2015 | Wentworth | H02S 20/23 52/747.1 |
| 2003/0070368 A1 | 4/2003 | Shingleton | |
| 2011/0000519 A1 | 1/2011 | West | |
| 2011/0214365 B1 | 9/2011 | Aftanas | |
| 2011/0277296 A1 | 11/2011 | Ramos | |
| 2013/0000689 A1 | 1/2013 | Baylon | |
| 2013/0125492 A1 * | 5/2013 | Molek | F24J 2/5211 52/489.1 |
| 2013/0232757 A1 | 9/2013 | Ramos | |
| 2014/0175244 A1 * | 6/2014 | West | E04D 1/12 248/316.7 |
| 2014/0305046 A1 | 10/2014 | Sterns et al. | |
| 2014/0353435 A1 * | 12/2014 | Liu | F16L 3/06 248/74.1 |
| 2015/0288320 A1 | 10/2015 | Stearns et al. | |
| 2016/0126884 A1 * | 5/2016 | Stearns | H02S 20/23 52/173.3 |
| 2018/0366930 A1 * | 12/2018 | Vaccaro | F16B 1/00 |

* cited by examiner

WIRE MANAGEMENT STRUCTURE FOR A RAIL-LESS SOLAR PANEL ASSEMBLY

BACKGROUND OF INVENTION

Field of the Invention

The present invention relates generally to novel and improved assembly components and method for installing solar panels on a roof that is efficient and simple to install. More specifically, this invention relates to the use of a system of components that enable an array of solar panel modules to be installed and electrically bonded together on a roof without the need to use rail guides to support the solar panel modules. Variations of the preferred embodiment are also provided

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the support elements are discrete components in a rail-less configuration. An installer secures each solar panel module to the support element and this is often difficult to do using by hand if additional tools are required. Additionally, the solar panel modules should be electrically grounded to the support elements so the entire array is electrically connected. It is desirable to provide a simple component structure in a rail-less solar panel array configuration that allows an installer to easily arrange and lock the solar panel modules to their support elements, while electrically grounding the modules to those same elements in the array without using additional or complicated tools.

In a typical rail-less system, one of the challenges in the installation of the solar panel array is to provide a simple and effective way to adjust or level the clamp assemblies that are used to support array skirts and solar panel modules. The current state of the art offers a rotating leveling bolt that is used to adjust the clamp. The bolt is typically threaded and is inserted into a threaded opening in the clamp assembly through a mounting plate. One limitation of this system is that it generally requires that the adjustment be made to the bolt below the clamp and often requires a custom bolt to accomplish the task.

The present system offers an improved leveling system that does not require a rotating leveling bolt, but instead utilizes a barrel bolt that is integrated into the clamp with a barrel nut and allows the installer to turn the barrel bolt as the means to adjust the clamp. The advantage to using this embodiment is that it allows installers to insert solar panel modules in the clamp first and then do adjustments later, which is something the state of the art does not offer. It also allows the installer to make any leveling adjustments from above the clamp rather than below it, which simplifies the adjustment process. Exemplary embodiments of the assembly are described below. The present invention overcomes these limitations and provides a solution that is both easy to, install, use, and manufacture.

The prior art also discloses splice assemblies that are used to join pairs of array skirts and pairs of solar panel modules. These prior art splices typically require that the array skirts or the solar panel modules be electrically bonded on both sides of the splice. The present invention offers an improvement to this system that enables the objects to be electrically bonded on only one side of the splice so that the solar panel modules on the other side of the splice are free to move. This provides an advantage over the prior art because it allows the splice to account for thermal expansion of the solar panel modules as well as enabling adjustments to the splice when the modules are already installed or not aligned perfectly. A spacer on the middle portion of the splice is also provided as an improvement over the prior art splices.

Prior art clamp assemblies utilize several wire bundles as part of the solar panel array installation. The prior art, however, does not include wire management functions that provide structures to secure and store these wire bundles that are safe and convenient. The present invention offers a wire management structure that utilizes a conduit in combination with a pivoting tab that is included beneath the clamp and splice assemblies, which provides an improvement over the prior art assemblies.

Prior art structures for electrically bonding solar panel modules and array skirts to a rail-less support assembly are limiting as well. The present invention offers improved electrical bonding structures that utilize linear bonding pins and clamps that address these limitations.

The present invention also discloses an improvement over prior art array skirts. Prior art array skirts often have connections that require additional securing mechanisms such as a tightening bolt that secures the array skirt to the clamp. The present invention provides an array skirt structure that eliminates the need for a tightening bolt. The present invention provides a latch or release lever on the lower side of the array skirt and allows the array skirt to be snapped into place at the mounting plate of the clamp and disengaged by pulling the release lever downward. The release lever can also be put on the clamp instead of the array skirt in the alternative. This offers an improvement over the prior art by allowing the array skirt to be easily disengaged with the simple release of the lever making it easy to install and uninstall if necessary.

SUMMARY OF THE INVENTION

The invention is summarized below only for purposes of introducing embodiments of the invention. The ultimate scope of the invention is to be limited only to the claims that follow the specification.

It is an object of this invention to provide an assembly for installing an array of solar panel modules on a residential roof.

It is a further object of this invention to provide an adjustable solar panel mounting assembly with a clamp.

It is a further object of this invention that the adjustable solar panel module assembly utilize a barrel nut to adjust the clamp.

It is a further object of this invention to adjust the barrel nut by utilizing a drive head on the top side of the barrel nut.

It is a further object of this invention that the clamp includes electrically conducting raised portions to provide an electrical conducting path between solar panel modules and array skirts with the clamp.

It is a further object of this invention to provide a splice for joining array skirts together in the array and solar panel modules in the array.

It is a further object of this invention to provide a splice where only one side of the splice allows free movement of the solar panel modules.

It is a further object of this invention to provide a wire management system that is coupled to the clamp.

It is a further object of this invention that the wire management system includes a conduit in combination with a tab that secures wires within the conduit.

It is a further object of this invention to provide a method of assembling a solar panel array utilizing the components described below.

A person with ordinary skill in the relevant art would know that any shape or size of the elements described below may be adopted as long as the assembly can be used to secure solar panel modules to the mounting elements and provide a grounding path from the modules to the mounting elements. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

Figure 1:
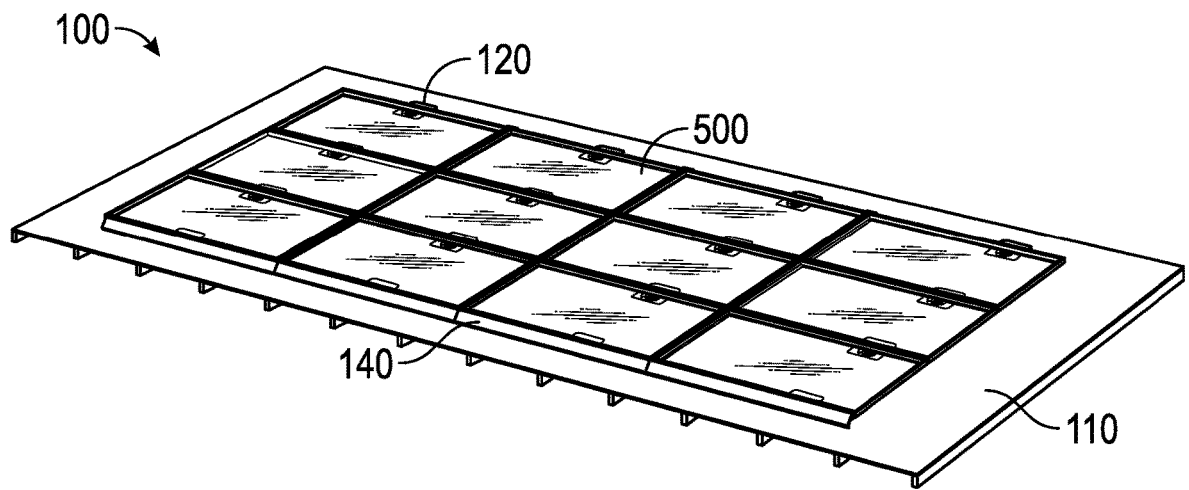
FIG. 1 illustrates a perspective view of a fully assembled solar panel array on a roof.
Figure 2:
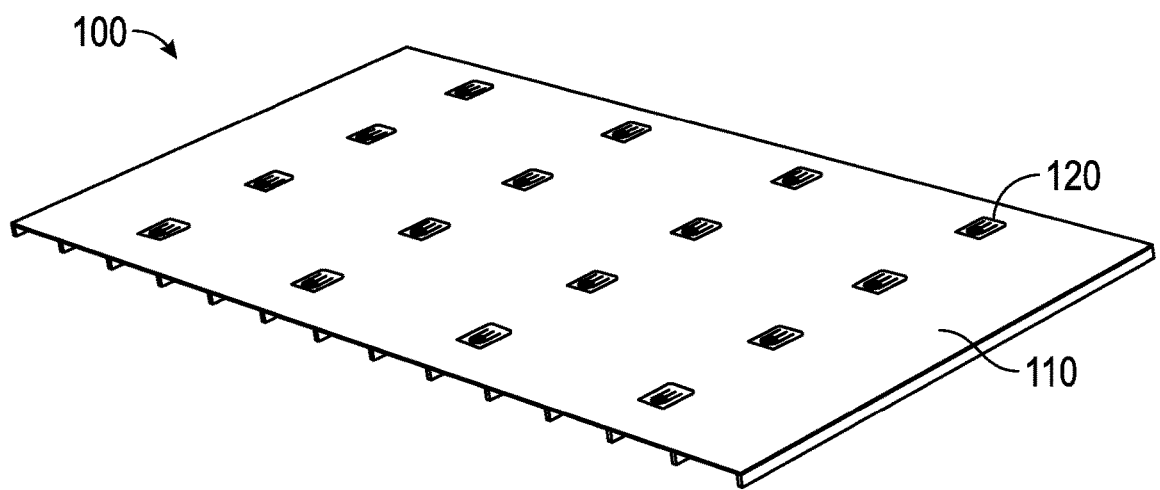
FIG. 2 illustrates a perspective view series of rows of flashings installed on the roof.
Figure 2A:
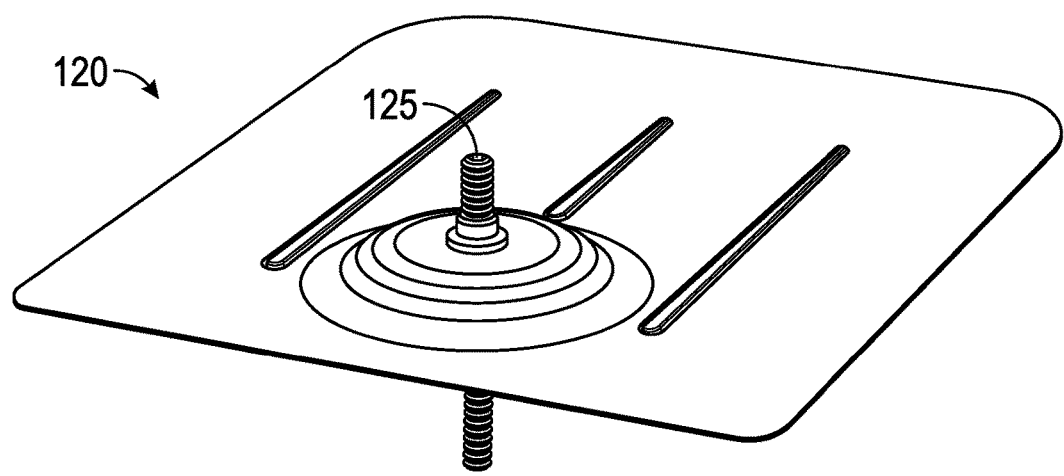
FIG. 2A illustrates an exemplary flashing used in the assembly.
Figure 3:
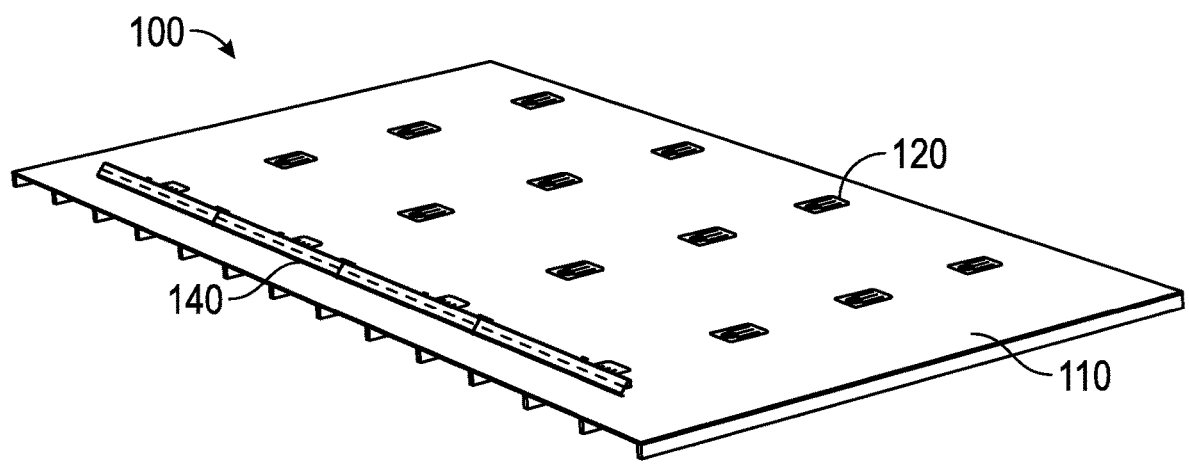
FIG. 3 illustrates a perspective view of a row of array skirts installed on the outer row of the array.
Figure 3A:
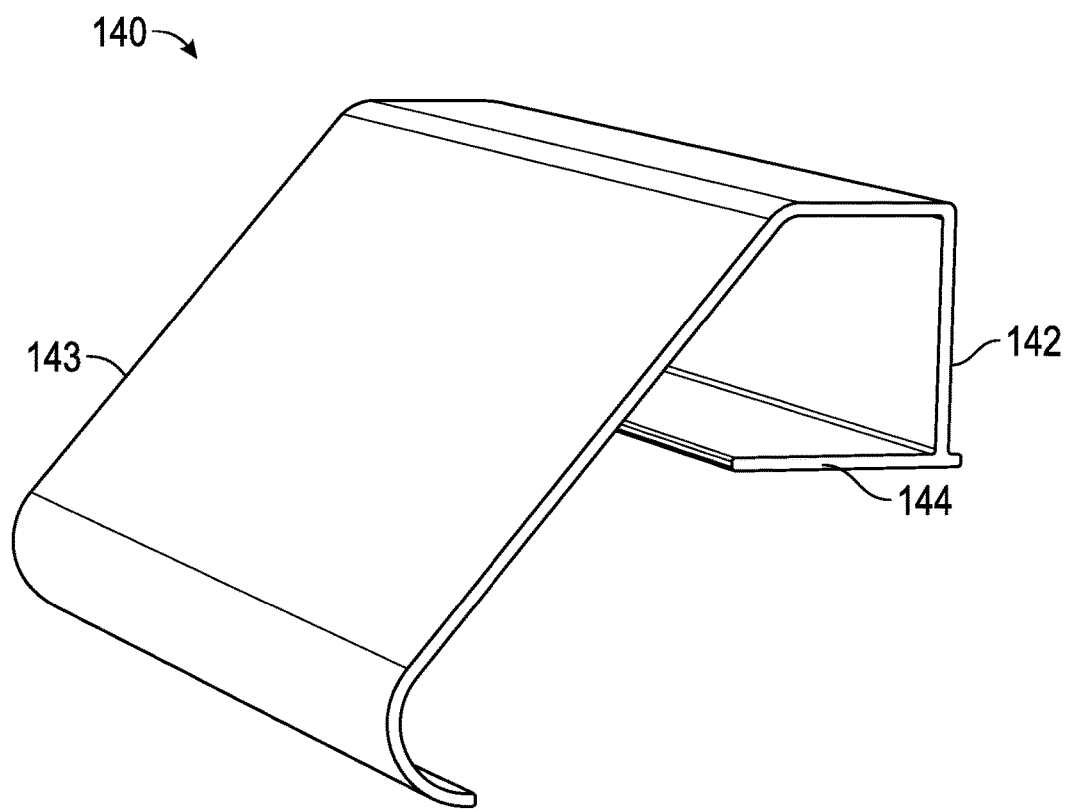
FIG. 3A illustrates an exemplary array skirt used in the assembly.
Figure 4:
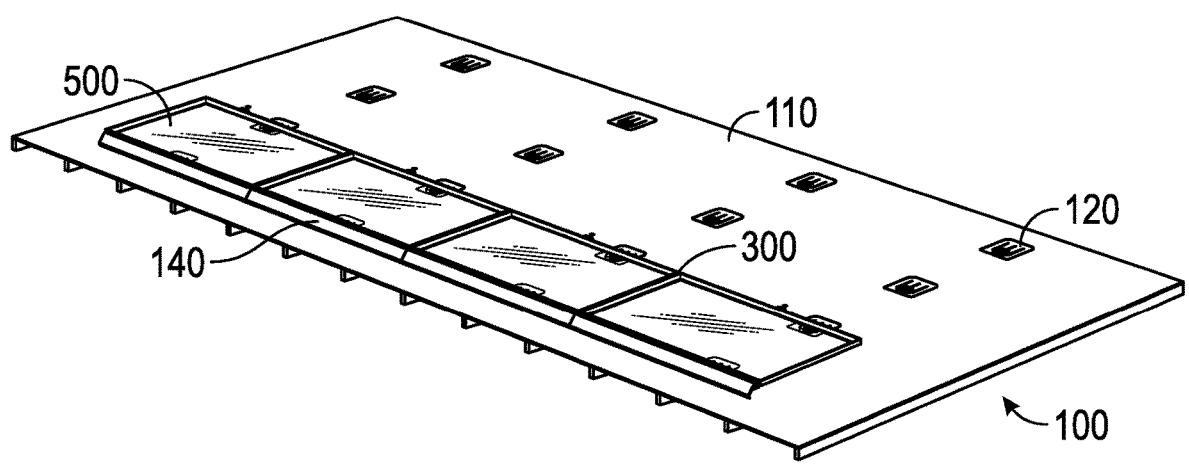
FIG. 4 illustrates a perspective view of a first row of solar panel modules installed behind the row of array skirts.
Figure 5:
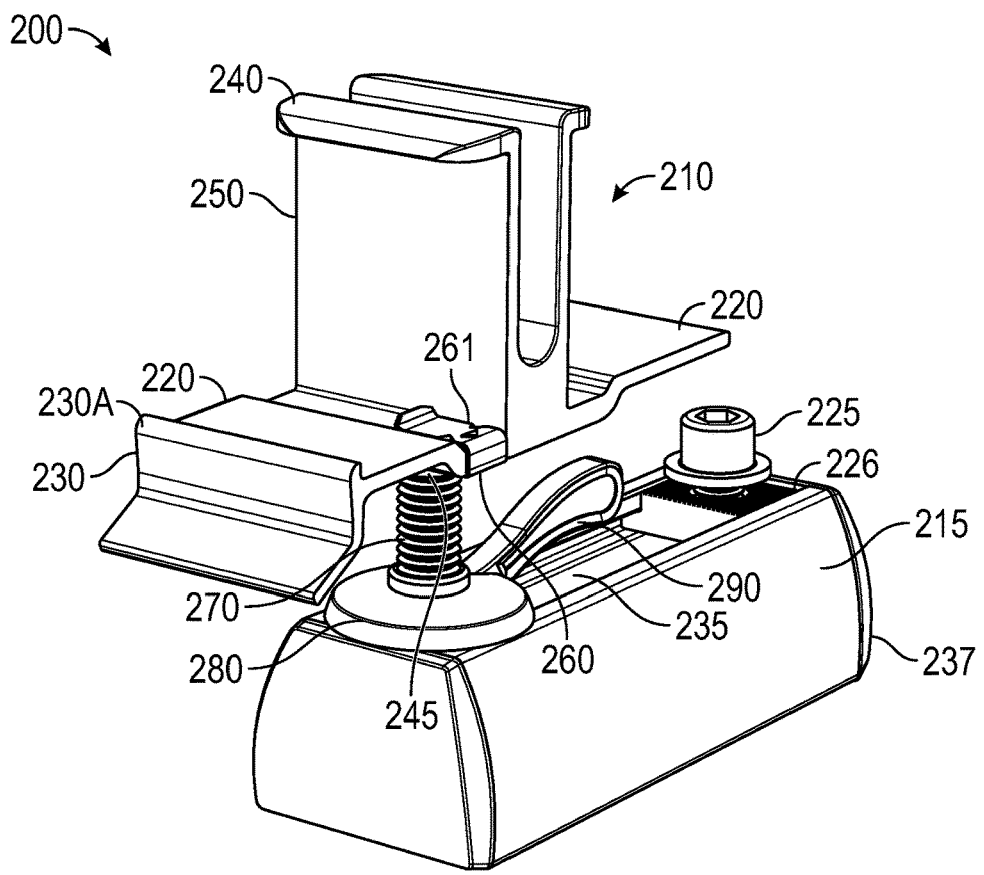
FIG. 5 illustrates a perspective view of an exemplary pivot mount assembly.

FIG. 1 shows a perspective view of a completed assembly of an exemplary solar panel array 100 as installed on a roof 110, and includes solar panel modules 500, array skirts 140, and flashings 120 that support several mounting plates that will be described below. FIGS. 2-4 show the steps of the installation of the array 100. FIG. 2 shows that each of the flashings 120 are first installed in rows on the roof 110. FIG. 2A illustrates and exemplary flashing 120 with a securing bolt 125. The flashing 120 can be of any suitable shape as long as it can provide structural support to the array 100. An exemplary mounting assembly 200 (as shown in FIG. 5 and discussed below) is secured to each of the flashings 120 typically, but not exclusively using the securing bolt 125. FIG. 3 shows a row of array skirts 140 that are installed on the outer row of the array 100. An exemplary array skirt 140 is shown in FIG. 3A. The array skirt 140 includes an extension plate 144, a rear back 142, and a front guard 143. In another exemplary embodiment as shown in FIG. 54, the array skirt 142 also includes a release lever 146 that provides an alternate means secure the array skirt 140 to a clamp 210. In this embodiment, when the array skirt 142 is rotated into place, the release lever 146 is coupled to the hook 221 that is located beneath the end of the south end of the mounting plate 220. The release lever 146 is typically made of resilient material that is secured at one end to the array skirt 142 so that when the release lever 146 is pulled downward, the array skirt 142 is then disengaged from the mounting plate 220 and the release lever 146 returns to its original position. The hook element 321 on the mounting plate is also used on a splice 300 as shown as element 321 in FIG. 53 so that the alternate array skirt 142 embodiment can be used with the splice 300.

Figure 6:
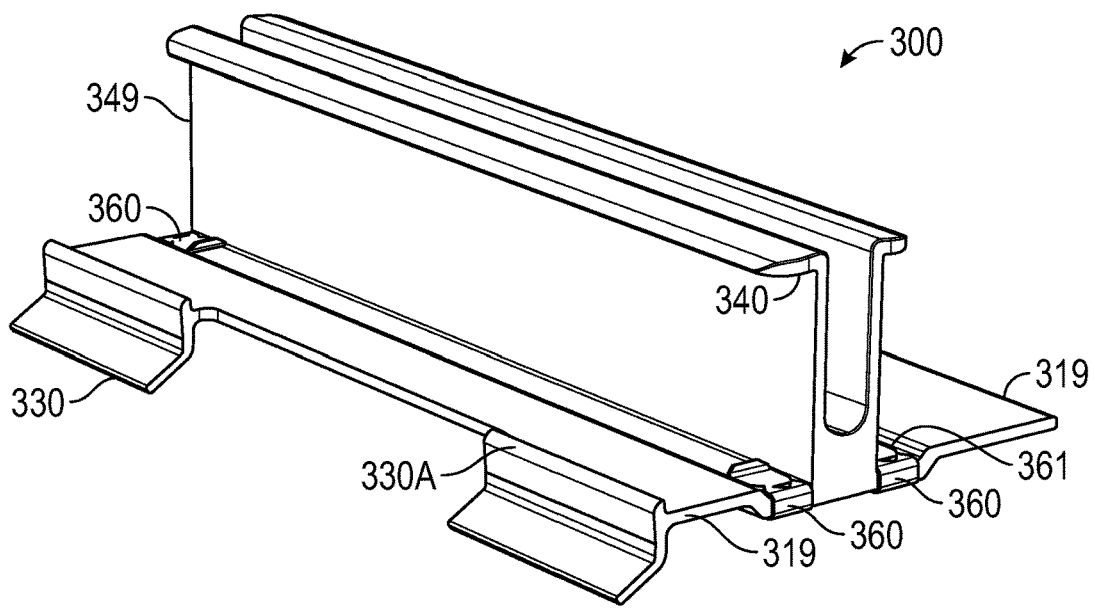
FIG. 6 illustrates a perspective view of an exemplary splice with binding clamps.

In the array 100, the array skirts 140 are typically located on the perimeter of the array 100. The array skirts 140 are installed along the mounting assemblies 200 and are joined together by splices 300 (as shown in FIG. 6 and discussed below). After array skirts 140 are installed, FIG. 4 shows that the modules 500 are typically installed behind the array skirts 140 on the rear (north side) of the mounting assemblies 200 and secured by splices 300. The modules 500 can then be installed back-to-back on a given roof producing the completed array in FIG. 1.

Figure 7:
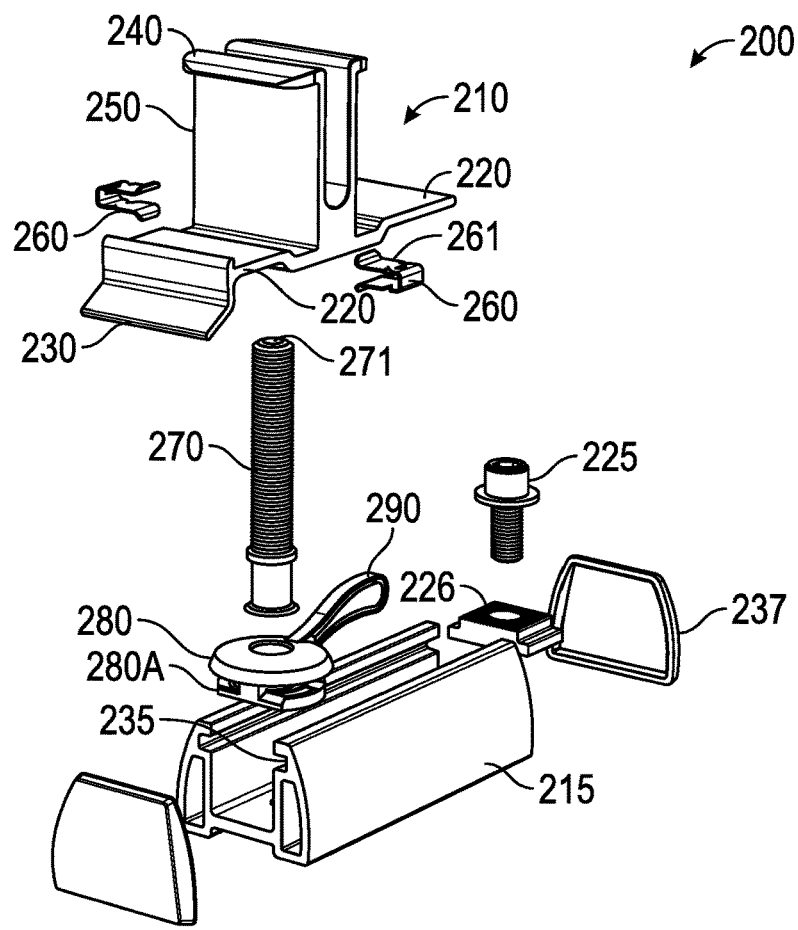
FIG. 7 illustrates an exploded view of the exemplary pivot mount assembly as shown in FIG. 5.

Several exemplary embodiments of mounting assemblies 200 are shown below. FIGS. 5 and 7 illustrate a perspective and exploded view of an exemplary pivot mount assembly 200. The assembly 200 includes a pivot rail 215. The pivot rail 215 has a slot 235 that receives a cam lock 280. The cam lock 280 includes a guide 280A and a handle 290 that is pivotally connected to the guide 280A and can rotate between a locked and an unlocked position. The guide 280A moves linearly along the slot 235 when the handle 290 is in the unlocked position. The pivot rail 215 also includes a pair of side caps 237. The pivot rail 215 is typically joined to the flashing 120 by utilizing the nut and bolt 225, which is inserted through a connecting guide 226 that fits within the slot 235 and is also capable of moving linearly along the slot 235.

A support clamp 210 includes a pair of mounting plates 220 that extend outward in opposite directions on its lower portion, and a pair of flanges 240 that also extend outward in opposite directions on its upper portion. The flange 240 is typically utilized to secure the top side of a solar panel module 500 or array skirt 140. A pair of rear walls 250 typically are positioned between the flanges 240 and the mounting plates 220. The support clamp 210 includes a cavity 245 and is typically threaded and positioned in the lower portion of the clamp 210 between the two walls 250. The support clamp 210 is typically electrically conductive. The clamp 210 can also include variations of the structure described above. It can include an embodiment where one or both flanges 240 are not present, or where only one rear wall 250 is included. The support clamp 210 is coupled to the pivot rail 215 by way of a leveling bolt 270. The leveling bolt 270 has an allen drive 271, or other suitable drive shape, on its top end and can be adjusted up or down by rotating the leveling bolt 270 either clockwise or counterclockwise. The leveling bolt 270 is typically threaded and can also be referred to as a shank or other similar term. The mounting plates 220 are generally flat and with the flanges 240 and rear wall 250 generally form an opening to receive the array skirt 140 or the solar panel module 500. One of the exemplary mounting plates 220 also includes a release lever 230. The release lever 230 generally receives the extension plate 144 of the array skirt 140 and can be secured into its notch 230A. The release lever 230 is flexible or resilient so that it can bend downward and release the extension plate 144.

The support clamp 210 also includes an electrical bonding clip 260. The bonding clip 260 is made of a conducting material and clips to the mounting plate 220 as shown. The bonding clip 260 includes a raised portion 261 that is typically sharp enough to penetrate the surface oxidation layer of an array skirt 140 or a solar panel module 500 and create an electrical path between the solar panel module 500 or the array skirt 140 and the mounting plate 220, which in turn creates an electrical path throughout the entire array 100.

FIG. 6 shows a perspective view of an exemplary splice 300. The splice's 300 primary function is to join two array skirts 140 or solar panel modules 500 in between two assemblies 200 in the middle portion of either side of the splice 300. This embodiment of the splice 300 includes a pair of mounting plates 319 that extend outward in opposite directions on its lower portion, and a pair of flanges 340 that also extend outward in opposite directions on its upper portion. A pair of rear walls 349 typically are positioned between the flanges 340 and the mounting plates 320. The mounting plates 319 are generally flat and with the flanges 340 and rear wall 349 generally form an opening to receive the array skirt 140 or the solar panel module 500. One of the exemplary mounting plates 319 also includes a release lever 330. The release lever 330 generally receives the extension plate 144 of the array skirt 140 and can be secured into its notch 330A. The release lever 330 is flexible or resilient so that it can bend downward and release the extension plate 144 and then return to its original position. The splice 300 also includes an electrical bonding clip 360. The bonding clip 360 is made of a conducting material and clips to the mounting plate 319 as shown. The bonding clip 360 includes a raised portion 361 that is typically sharp enough to penetrate the surface oxidation layer of an array skirt 140 or a solar panel module 500 and create an electrical path between the solar panel module 500 or the array skirt 140 and the mounting plate 319, which in turn electrically bonds the entire array 100.

Figure 8:
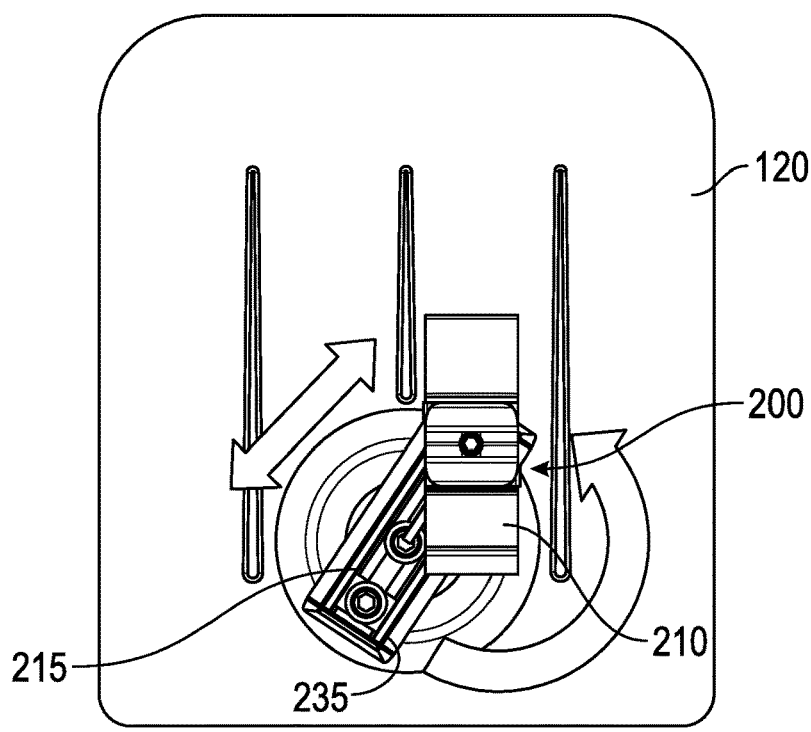
FIG. 8 illustrates a top view of the pivot mount assembly shown in FIGS. 5 and 7 as connected to the flashing through the pivot rail.

FIG. 8 shows a top view of the pivot mount assembly 200 as connected to the flashing 120 through the pivot rail 215. The pivot rail 215 can move linearly along the slot 235 or rotate a full 360 degrees around the nut and bolt 225 when connected to the securing bolt 125. Likewise, the support clamp 210 can rotate a full 360 degrees around the leveling bolt 270 and can move linearly along the slot 235 by way of the guide 280A.

Figure 9:
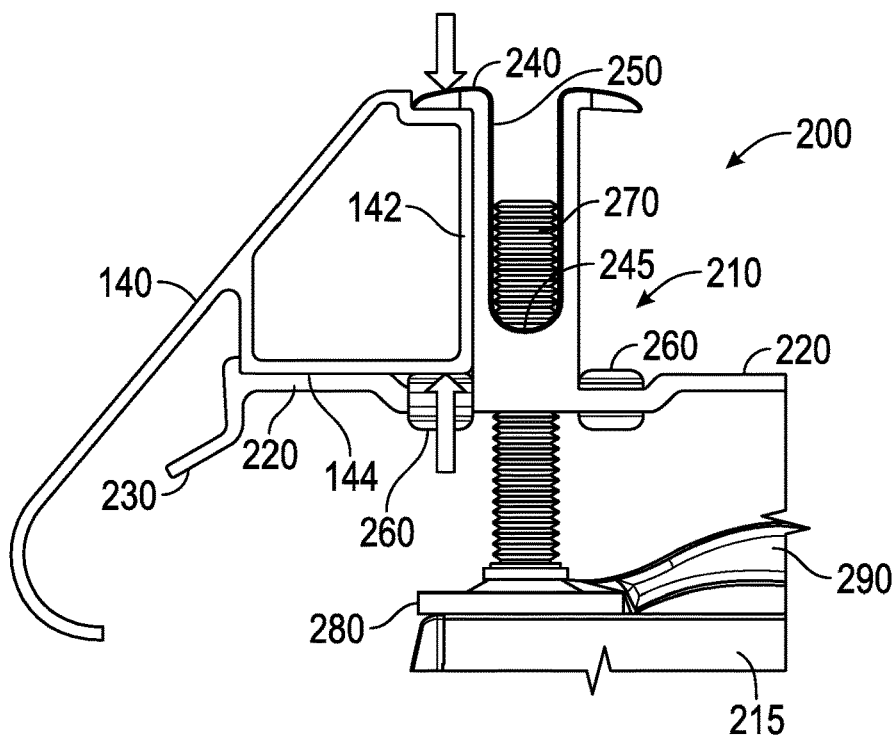
FIG. 9 illustrates a side view of the mounting assembly as shown in FIGS. 5 and 7 with the array skirt installed.

FIG. 9 illustrates a side view of the pivot mount assembly 200 with the array skirt 140 installed in the support clamp 210. The extension plate 144 of the array skirt 140 is in full contact with the bonding clip 260 and the clip 260 has penetrated the surface area of the extension plate 144. At the same time, the rear 142 of the array skirt contacts the rear wall 250 of the clamp and the upper portion of the array skirt 140 is positioned within the flange 240 of the clamp. From this view, the details of the middle portion of the clamp 210 can be seen. The leveling bolt 270 has secured the clamp to the pivot rail 215 through the cavity 245.

Figure 10:
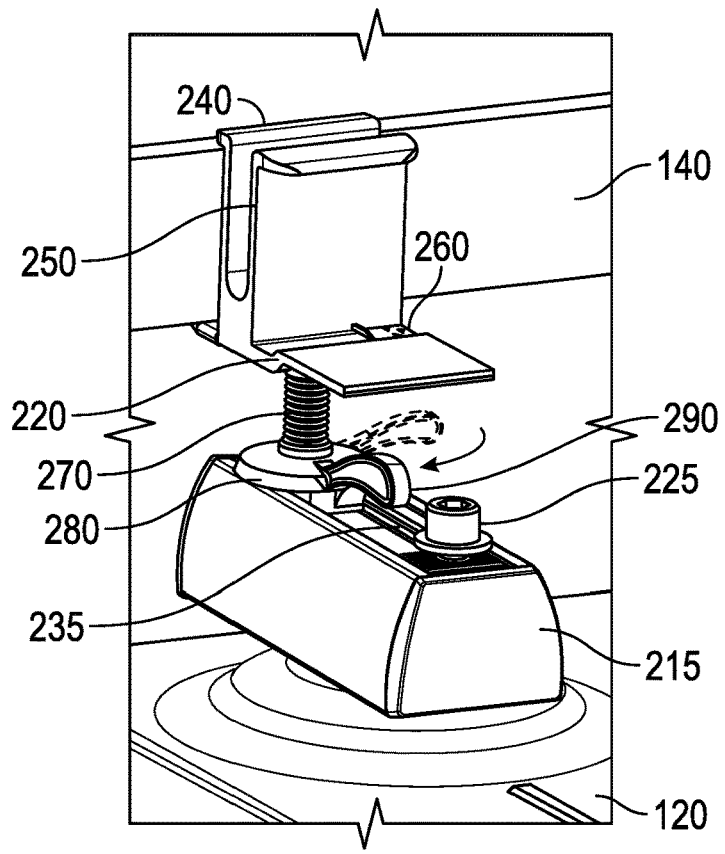
FIG. 10 illustrates a rear view of the mounting assembly as shown in FIGS. 5 and 7 fully installed and secured to the flashing.

FIG. 10 illustrates a rear view of the mounting assembly fully installed and secured to the flashing 120. The figure shows the cam lock handle 290 rotating from the unlocked position, which allows the guide 280A to move linearly along the slot 235, to a locked position, which secures the guide 280A in place.

Figure 11A:
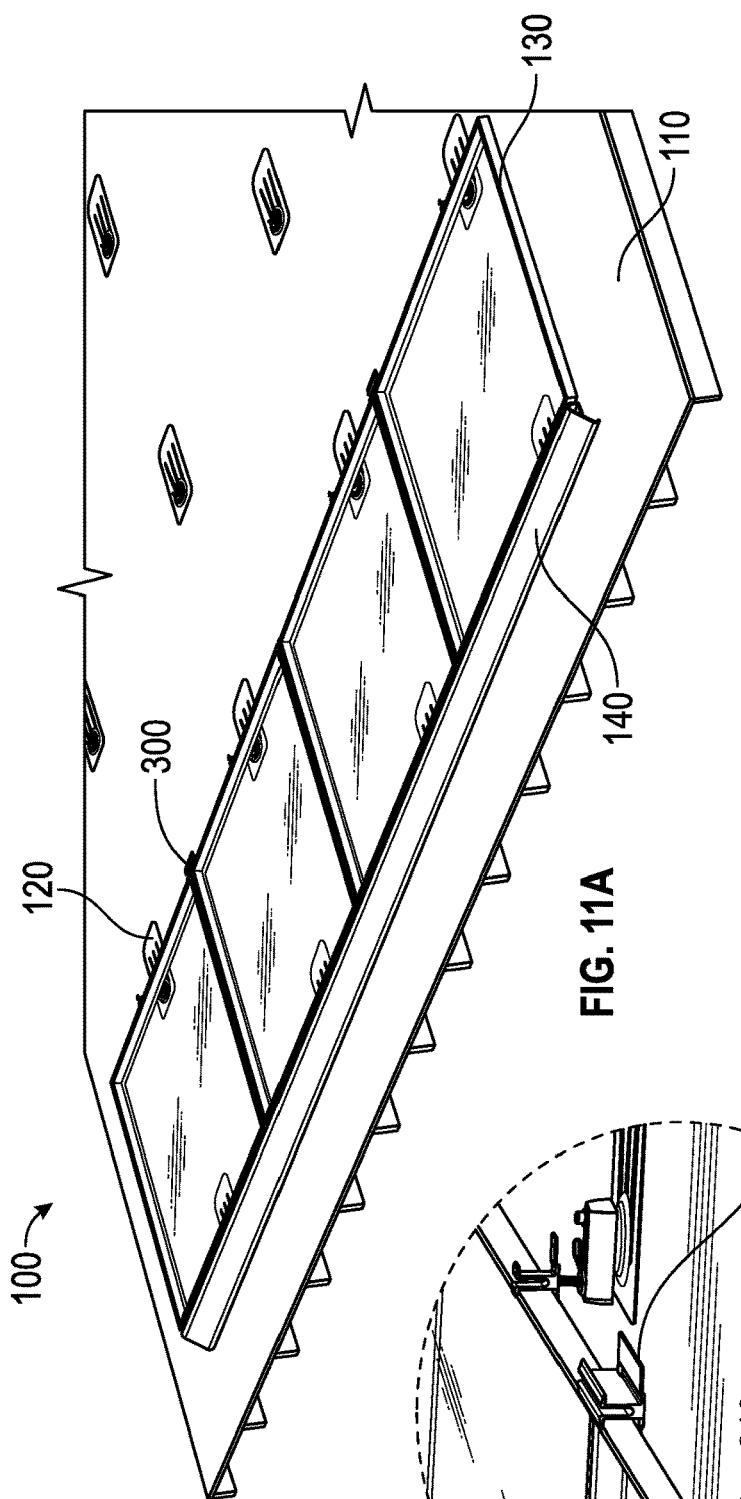
FIG. 11A illustrates a perspective view of the first row in the solar panel array 100 using the rail-less configuration.
Figure 11B:
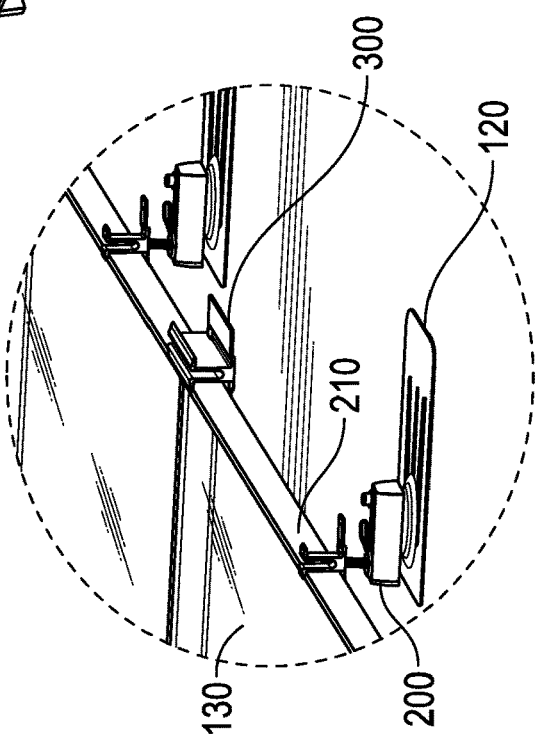
FIG. 11B is a detailed perspective view of the north side of the first row of solar panel modules.

FIG. 11A illustrates a perspective view of the first row in the solar panel array 100 using the rail-less configuration as described herein with a row of array skirts 140 secured to the front row of the solar panel array 100. When describing the assembly of the array 100, the side where the array skirts 140 (or the lower portion of the roof 110) will be referred to as the "south side" and the side opposite the array skirts 140 will be referred to as the "north side." A first array skirt 140 is inserted into the south side of clamp 210 generally in the middle portion of the array skirt 140 as shown in FIG. 9. A second array skirt 140 is then coupled to the opposite end of the first array skirt 140 at a splice 300, and the process is repeated until the end of the first row is completed. The first row of solar panels 500 is then installed. A first solar panel module 500 is inserted in the clamp 210 on the north side where the first array skirt 140 was installed, and it is then aligned with that array skirt 140. As shown in FIG. 11B, which is a detailed perspective view of the north side of the first row of solar panel modules, the solar panel module 500 is then lowered on to the south side of a clamp 210 in a second row of the array. A second solar panel module 500 is then coupled to the opposite end of the first solar panel module 500 at a splice 300 and the process is repeated until the end of the first row of solar panels 500 is installed. Each assembly 200 can be adjusted by rotating the leveling bolt 270, which raises or lowers the height of the clamp 210. Once installed, the assembly 200 is locked in place by rotating the cam lock handle 290 from the open to the locked position.

Figure 12:
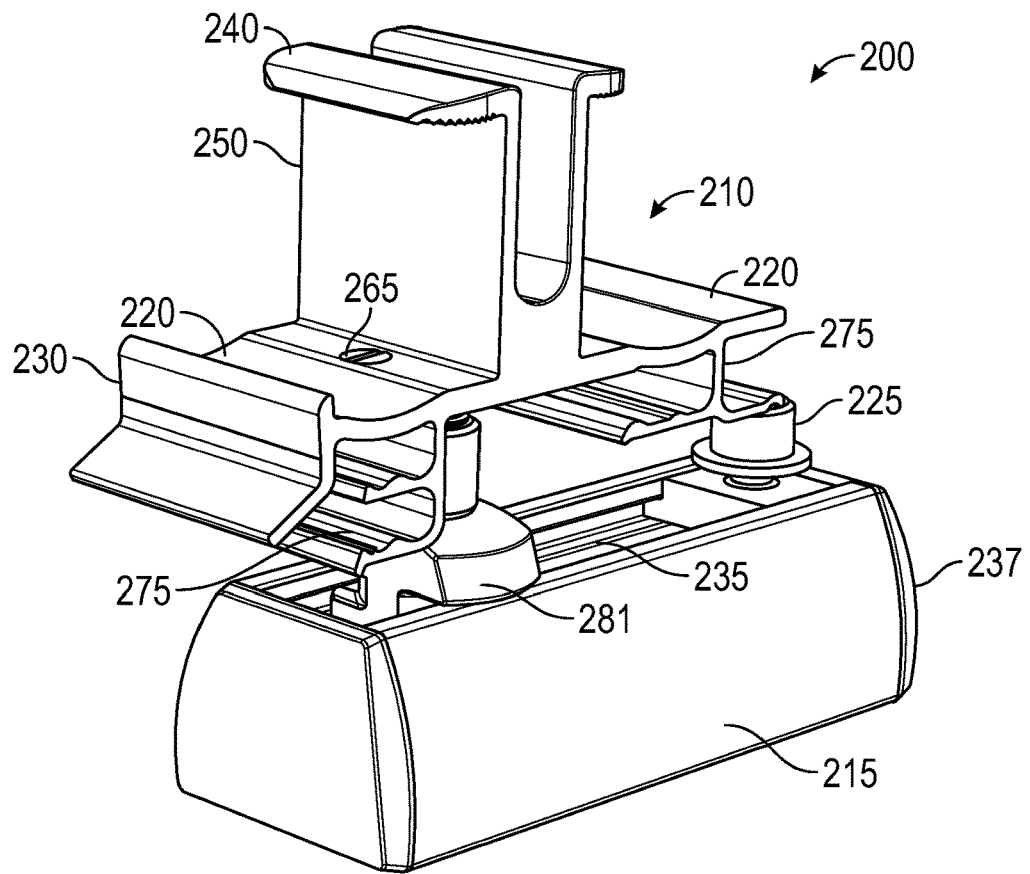
FIG. 12 illustrates a perspective view of an alternate embodiment of the assembly 200 as shown in FIGS. 5 and 7.
Figure 13:
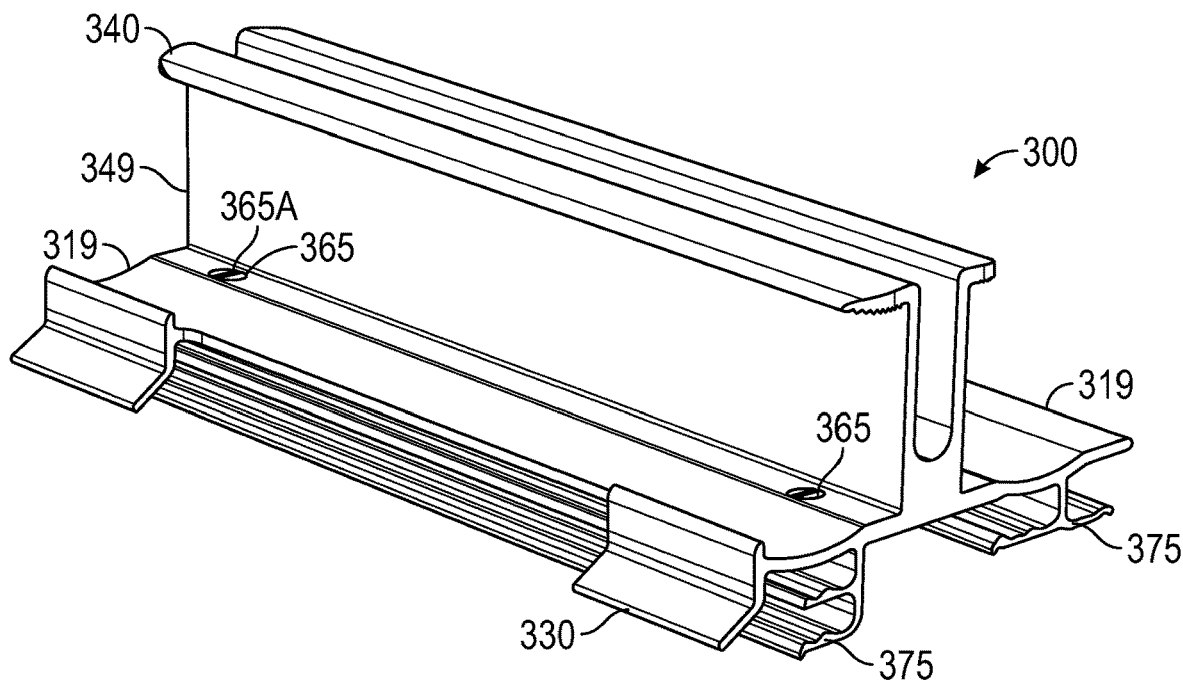
FIG. 13 illustrates a perspective view of an alternate embodiment of the splice shown in FIG. 6 utilizing binding clamps.
Figure 14:
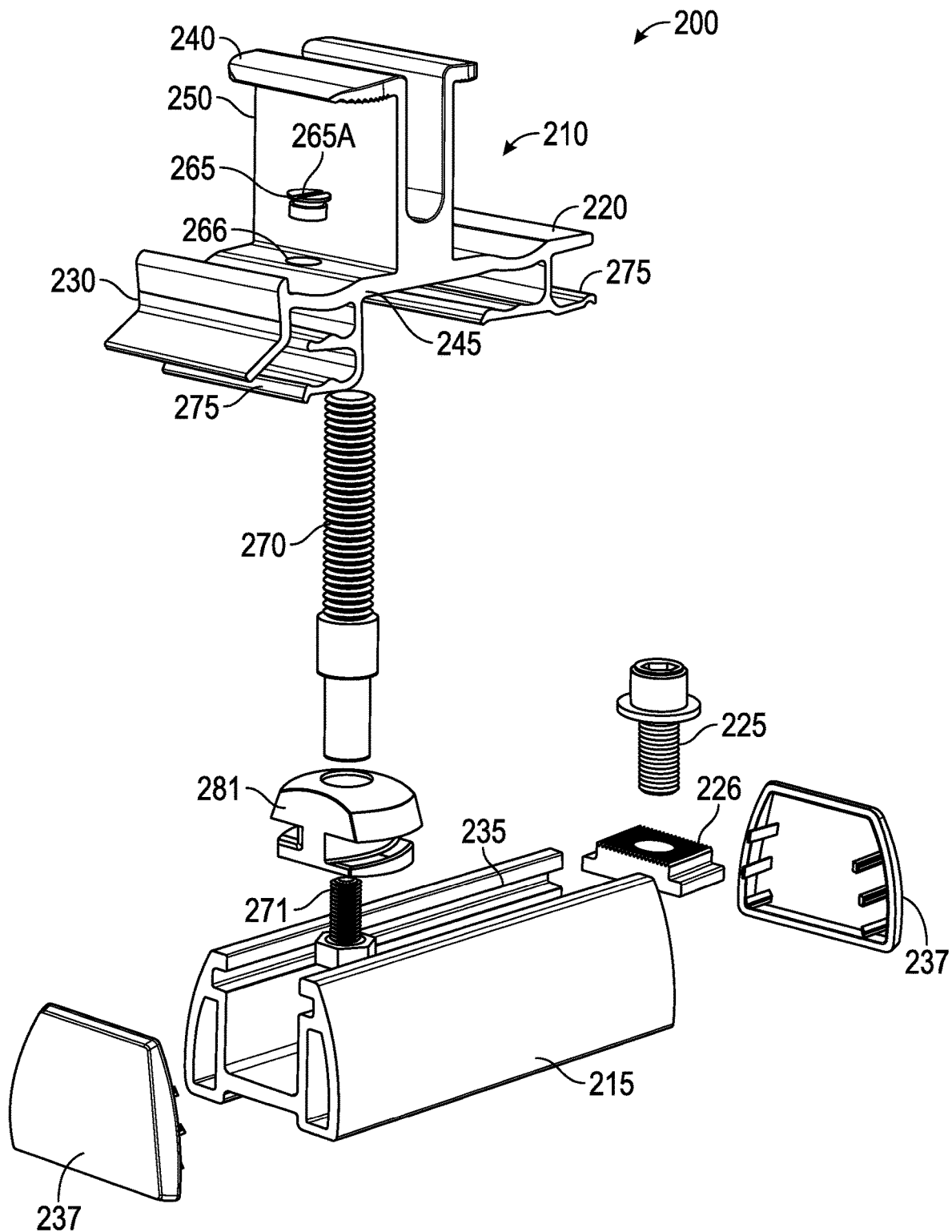
FIG. 14 illustrates an exploded view of the assembly shown in FIG. 12.

Another exemplary embodiment of the assembly illustrated in FIGS. 5 and 7 is shown in FIGS. 12-14. FIG. 12 illustrates a perspective view of the assembly 200, while FIG. 14 illustrates an exploded view of the assembly shown in FIG. 12. In this embodiment, instead of utilizing a clip 260 on the support clamp 210, an electrical bonding pin 265 is provided and inserted into a hole 266 in the mounting plate 220 as shown in FIG. 14. The pin 265 has a blunt raised portion 265A on the top of its head. The raised portion 265A, is typically sharp enough to penetrate the surface oxidation layer of an array skirt 140 or a solar panel module 500 and create an electrical path between the solar panel module 500 or the array skirt 140 and the mounting plate 220, which in turn electrically bonds the entire array 100. In this embodiment, the pin 265 is cylindrically shaped with a head at one end, but it can be of any suitable shape that can provide the function as described above. The mounting plate 220 also includes a conduit 275 on both the north and south sides of the mounting plate 220. The conduit 275 typically runs along and beneath the length of the mounting plate 220. The conduit 275 provides an integrated wire management feature that allows the wires that are used to install the solar panel array 100 to be safely and securely stored while keeping the wires out of plain sight and resting on the roof 110 where they can be damaged by the elements. This embodiment also includes a cam lock 281, but instead of using a handle to turn the cam lock 281 from an open to a closed position, the cam lock 281 is secured to the slot 235 in the pivot rail 215 by using a retaining bolt 271 that is inserted into the leveling bolt 270 as shown in FIG. 14.

FIG. 13 illustrates a perspective view of an alternate embodiment of the splice shown in FIG. 6. In this embodiment, as with the assembly 200, instead of utilizing a clip 360 each side of the mounting plate 310, a pair of electrical bonding pins 365 are provided and inserted into the mounting plate 319. The pin 365 has a blunt raised portion 265A on the top of its head. The raised portion 365A, is typically sharp enough to penetrate the surface oxidation layer of an array skirt 140 or a solar panel module 500 and create an electrical path between the solar panel module 500 or the array skirt 140 and the mounting plate 319 along with the bonding pins 265 in the clamp assemblies 200, electrically bond the entire array 100. The mounting plate 319 in the splice 300 also includes a conduit 375 on both the north and south sides of the mounting plate 319. Like that of the conduit 275 for the clamp 210, the conduit 375 typically runs beneath the length of the splice 300 and provides an integrated wire management feature that allows the wires that are used to install the solar panel array 100 to be safely and securely stored while keeping the wires out of plain sight and resting above the roof 110 where they can be damaged by the elements.

Figure 15:
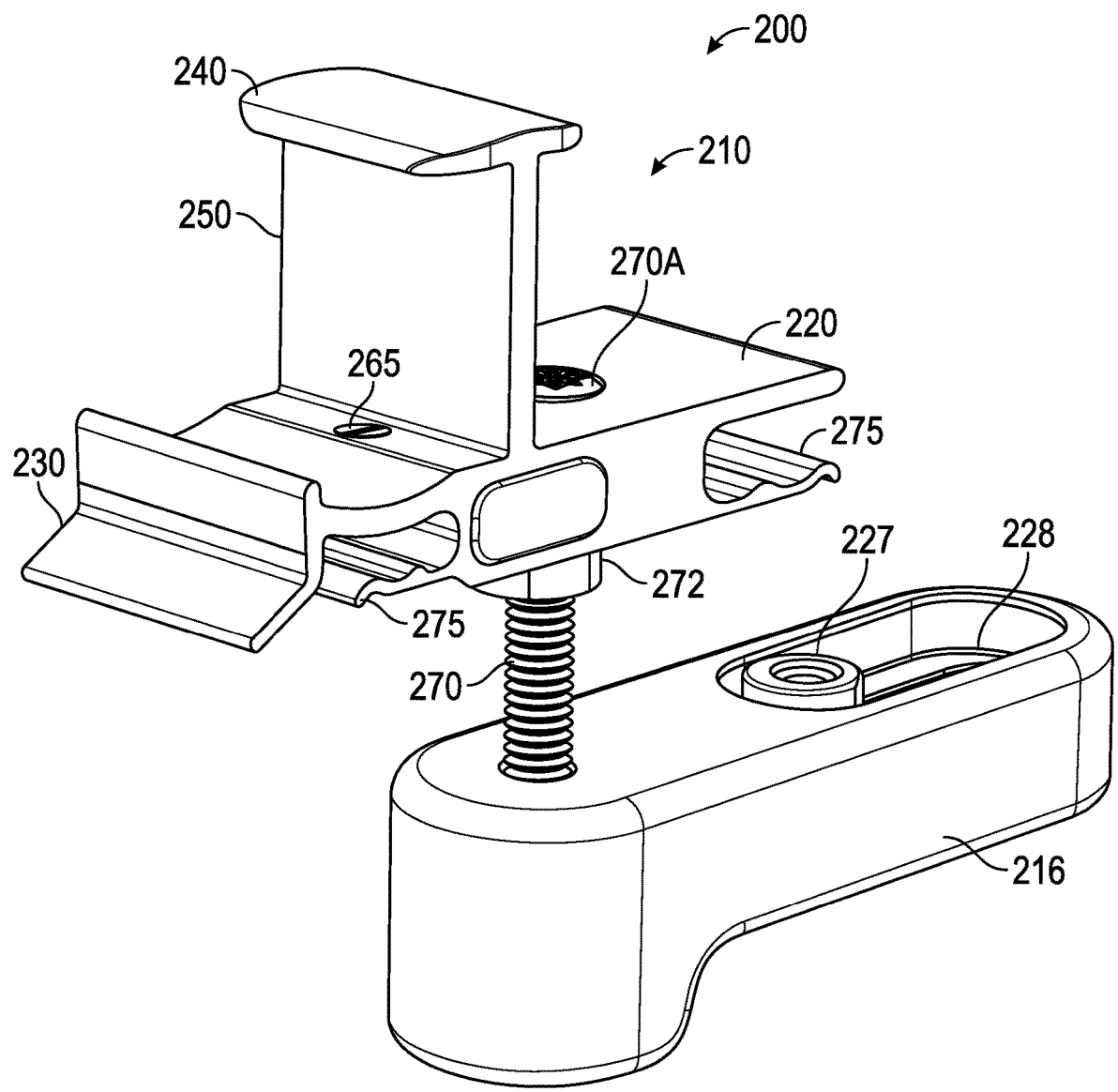
FIG. 15 illustrates a perspective view of an alternate embodiment of the assembly shown in FIGS. 12 and 14.
Figure 16:
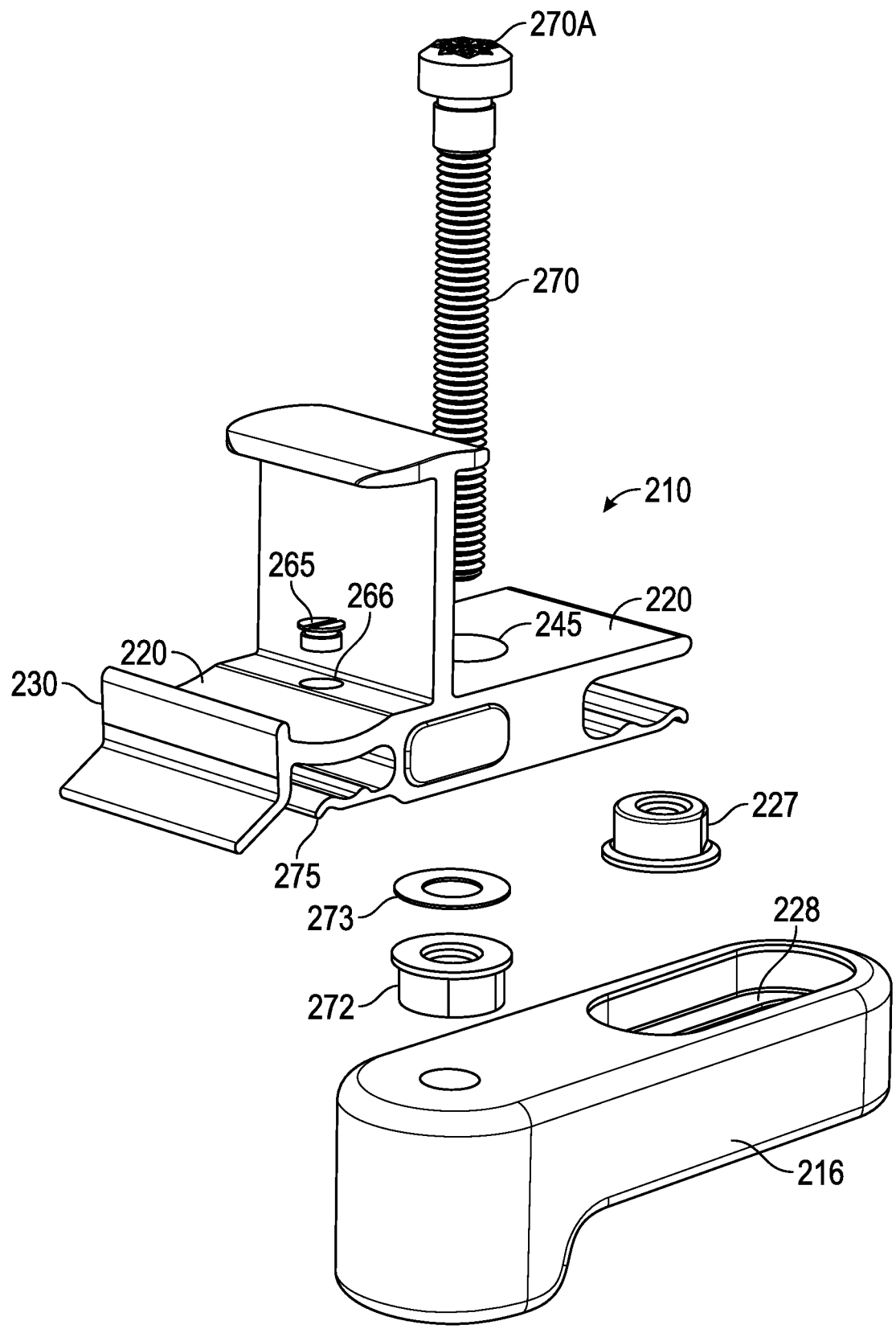
FIG. 16 illustrates an exploded view of the assembly shown in FIG. 15.

FIGS. 15-18 provide another exemplary embodiment of the assembly 200 as shown in FIGS. 12 and 14. FIG. 15 illustrates a perspective view of the assembly 200 and provides some variations, while FIG. 16 illustrates an exploded view of the assembly 200 shown in FIG. 15. First, a pivot arm 216 is utilized instead of the pivot rail 215. The pivot arm 216 functions similarly to that of the pivot rail 215. The pivot arm 216 includes a slot 228 where it is secured to the securing bolt 125 of the flashing 120 with a retaining bolt 227. The pivot arm can move linearly along the slot 228 and can be rotated 360 degrees around the securing bolt 125 to allow an installer to put the pivot arm 216 in the proper location. The clamp 210 is coupled to the pivot arm 216 using the leveling bolt 265. In this embodiment, the leveling bolt 270 is inserted through a hole 245 on the north side of the clamp 210 and is screwed into an end of the pivot arm 216 as shown. The leveling bolt 265 includes a serrated head 270A that functions in the same way the raised portion 265A does on the bonding pin 265.

Figure 17:
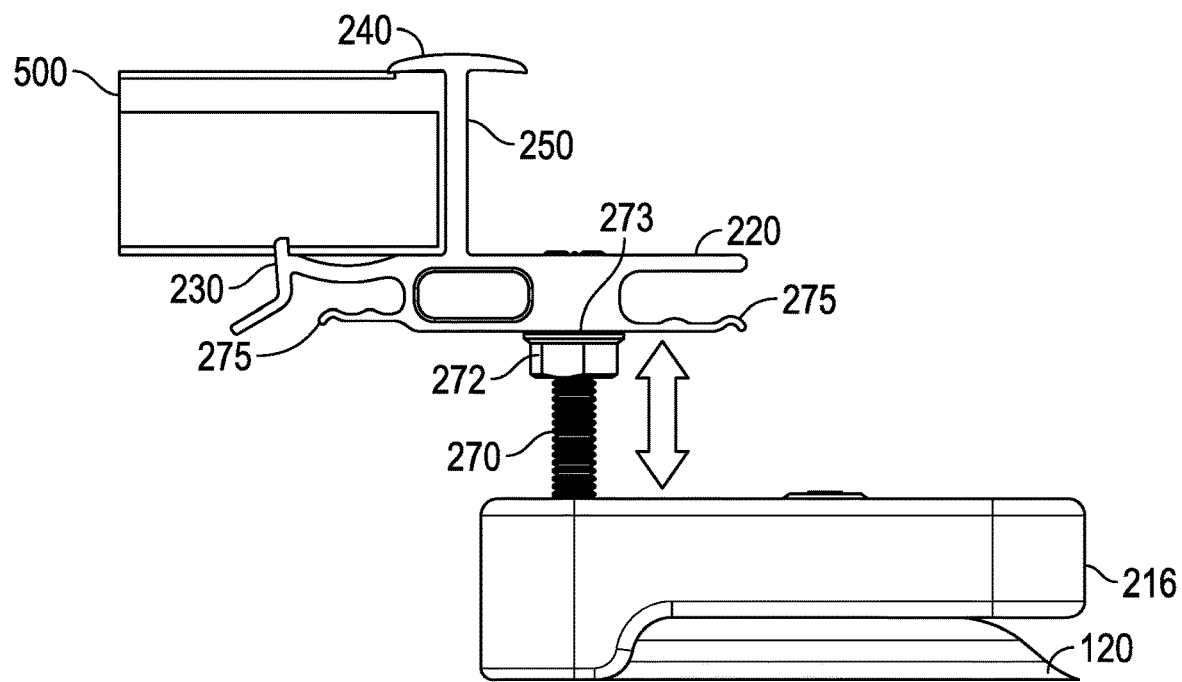
FIG. 17 illustrates a side view of the assembly as shown in FIG. 15 with the pivot arm installed to the flashing.
Figure 18:
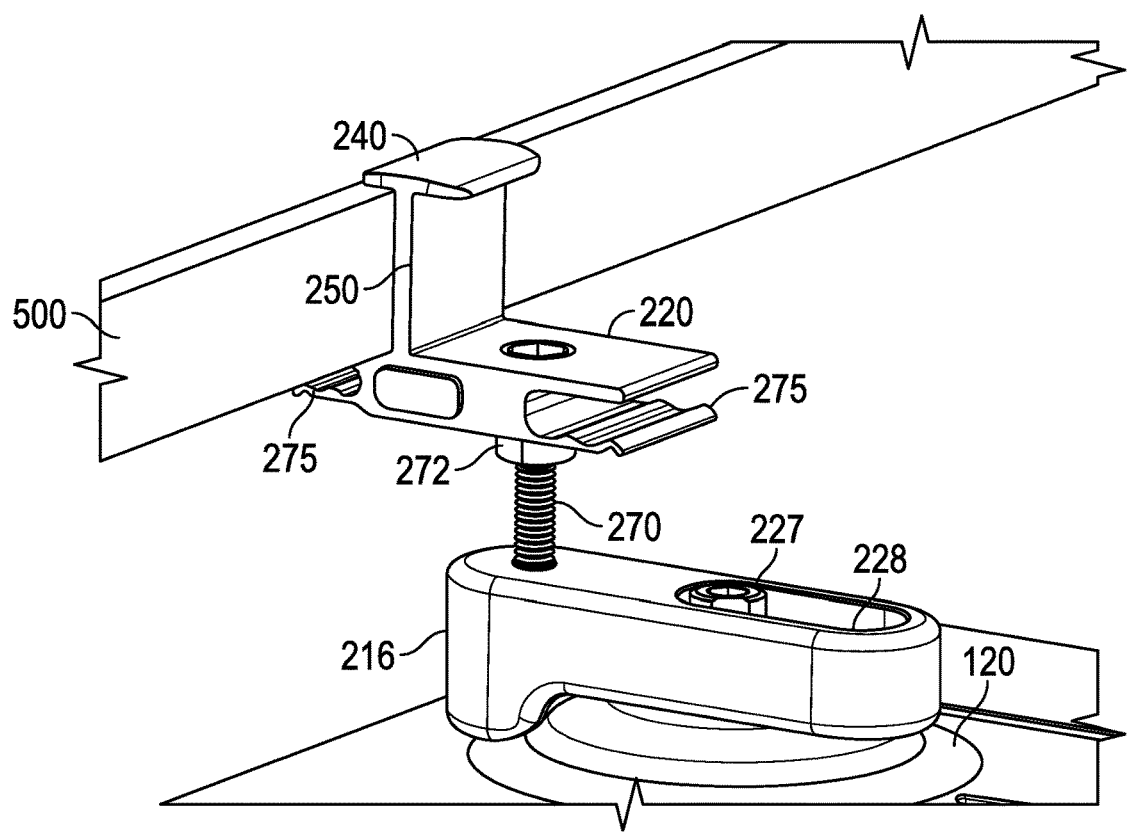
FIG. 18 illustrates a perspective view of the assembly as shown in FIG. 17.

FIG. 17 illustrates a side view of the assembly 200 with the pivot arm 216 installed to the flashing 120. It also shows how the solar panel module 500 is installed on the north side of the clamp 210. The serrated head 270A typically includes an allen drive so that the leveling bolt 270 can be moved vertically within the pivot arm 216. The leveling bolt 270 is secured to the clamp 210 by using a combination bushing 273 and leveling bolt nut 272. FIG. 18 illustrates a perspective view of the assembly 200 as shown in FIG. 17.

Figure 19:
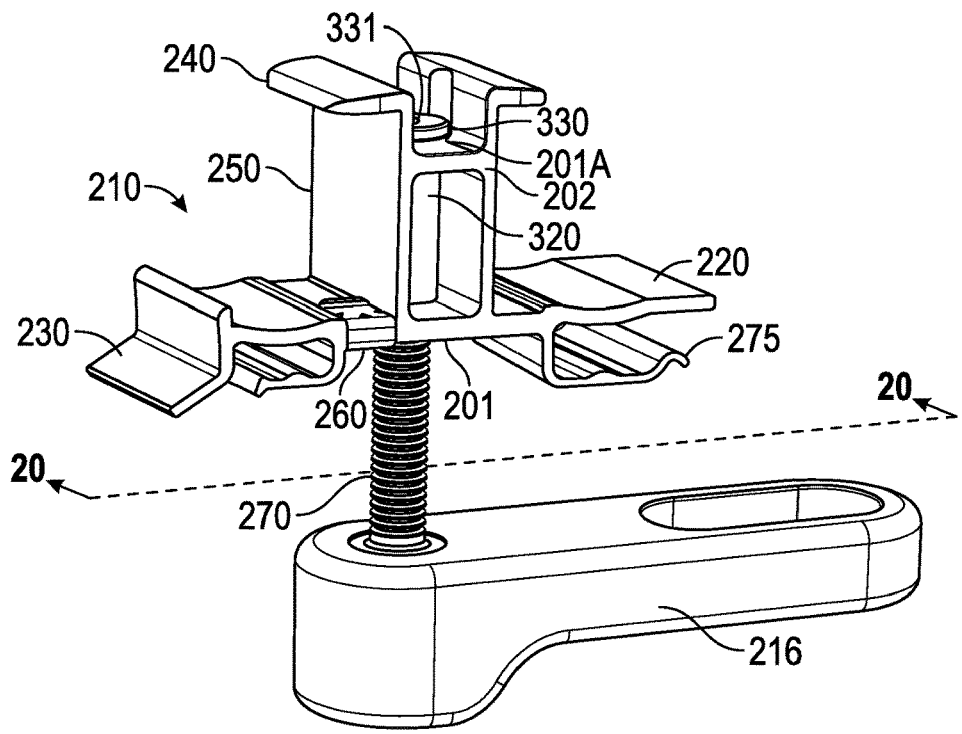
FIG. 19 illustrates a side view of the assembly as shown in FIGS. 15-18.
Figure 20:
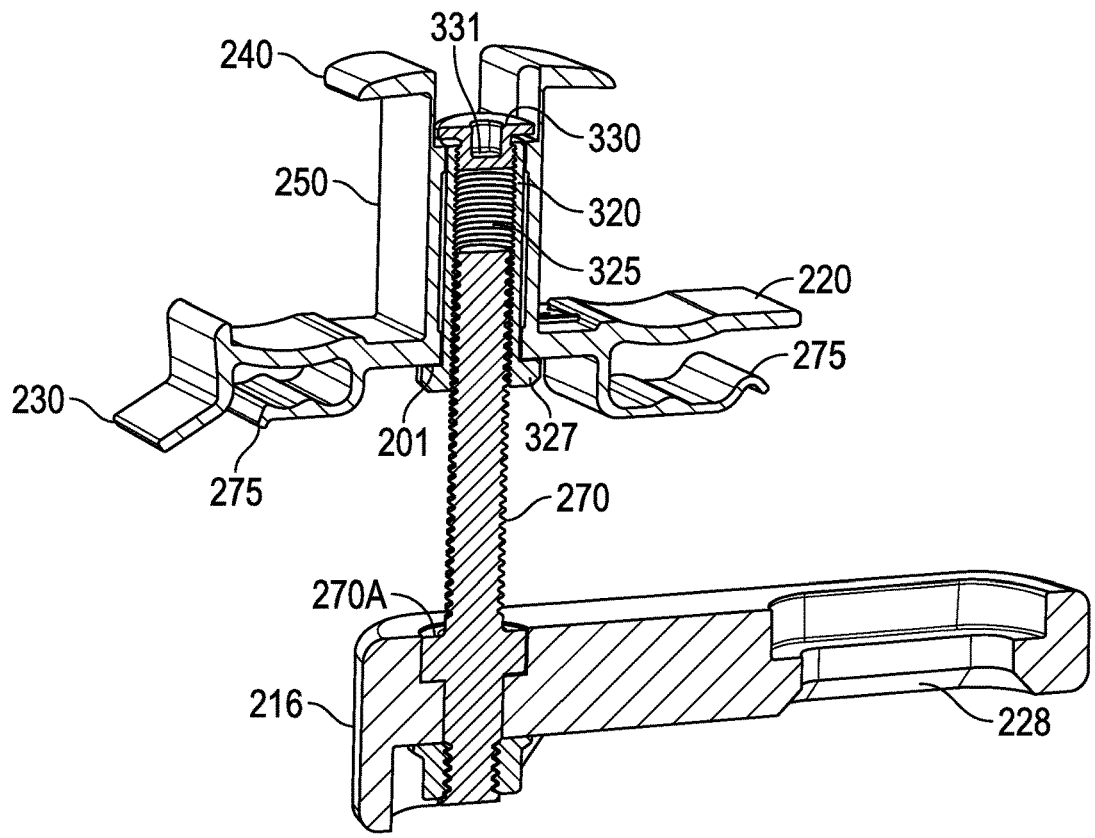
FIG. 20 illustrates a cross-sectional view of the embodiment in FIG. 19.

FIGS. 19-23 provide another exemplary embodiment of the assembly. FIG. 19 shows a side view of the assembly 200 as shown in FIGS. 15-18 and FIG. 20 is a cross-sectional view of the embodiment in FIG. 19. This embodiment provides an alternate means of vertically adjusting the clamp 210 and utilizes grounding clamps 260 in place of the pins 265 for electrical bonding although either are adequate substitutes for each other to provide that function. As shown, FIG. 19 includes a leveling barrel nut 320 and a barrel nut drive head 330, which includes an allen drive 331. The clamp 210 includes a cavity 201 on the lower portion of the mounting plate 220. In this embodiment, a bridge 202 with a second cavity 201A is also provided in the upper portion of the clamp 210, but a single cavity 201 can extend within the length of the middle of the clamp 210 as well. The barrel nut 320 also includes a lower lip 327 and is typically inserted through the cavity 201 and the cavity 201A until the lower lip 327 reaches the bottom of the mounting plate 220. As shown in FIG. 20, the inside of the barrel nut 320 is threaded 325 so that the barrel nut can receive the threads on the leveling bolt 270.

Figure 21:
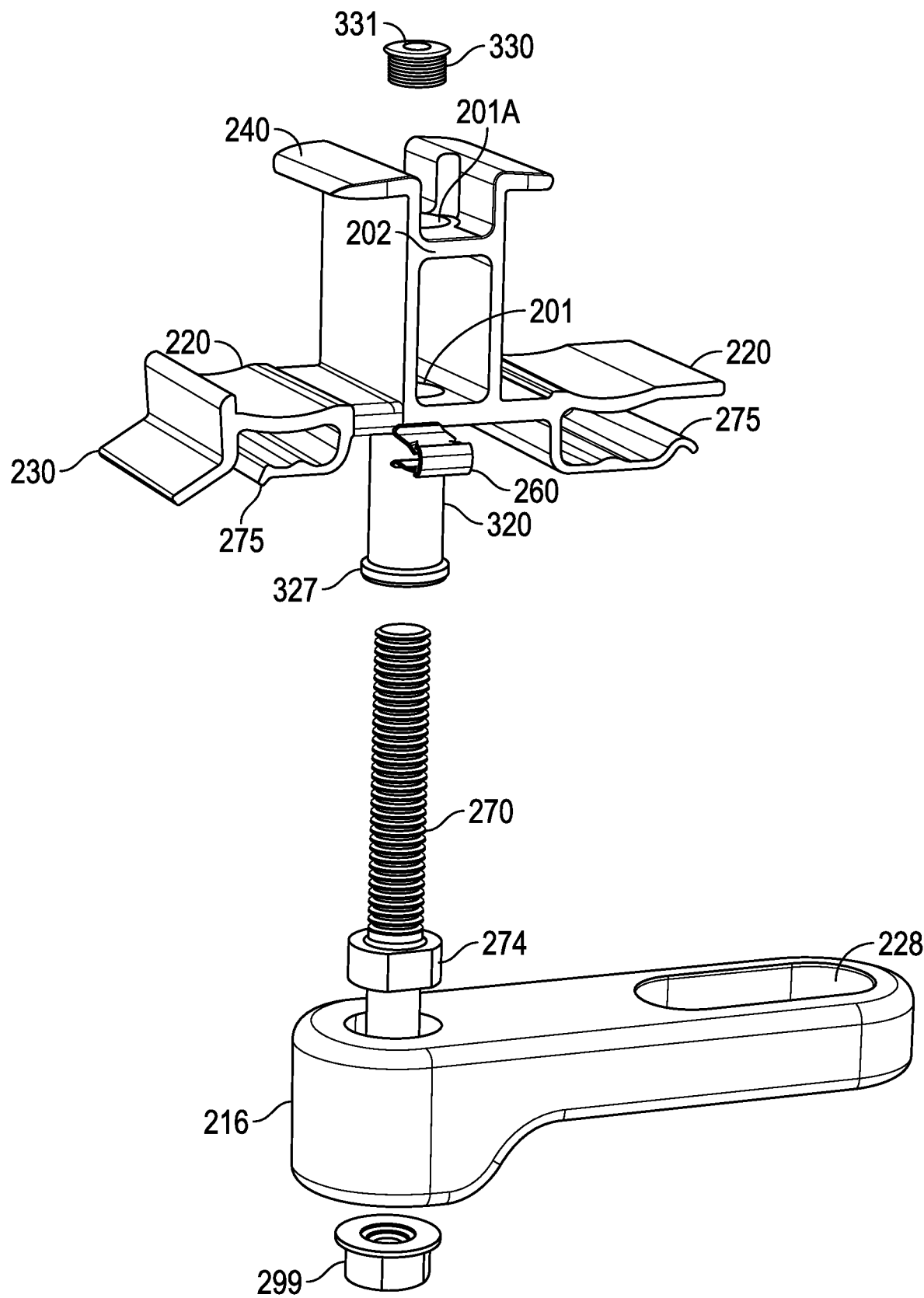
FIG. 21 illustrates an exploded view of the assembly in FIGS. 19-20.
Figure 22:
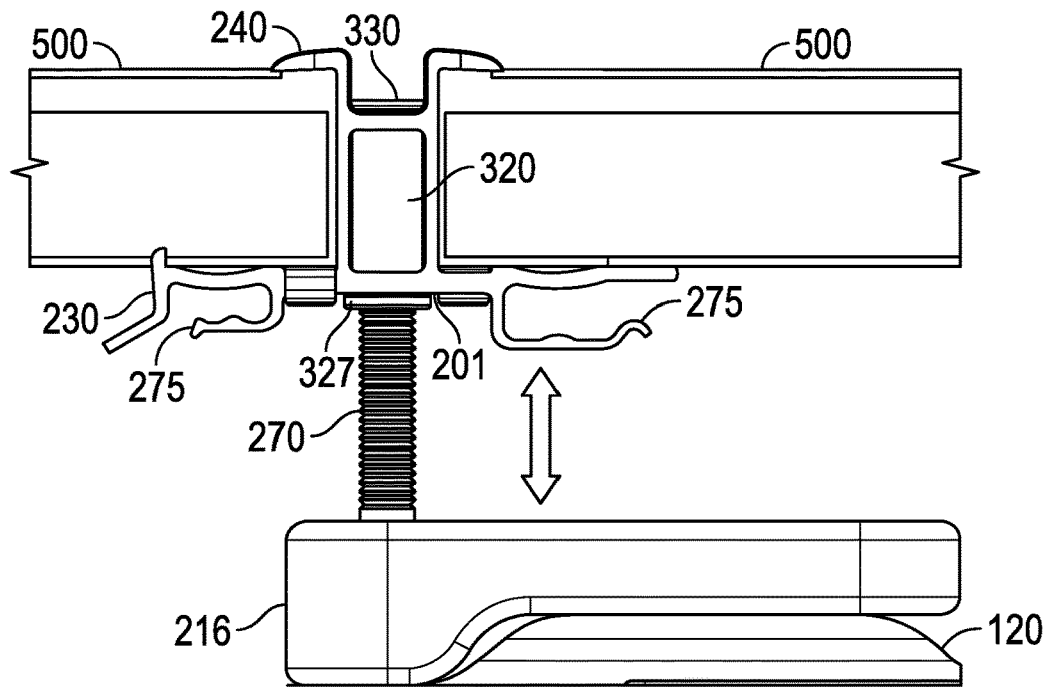
FIG. 22 illustrates a side view of the completed assembly with two solar panel modules inserted into the clamp and the barrel nut drive head inserted into the top of the barrel nut.

FIG. 21 illustrates an exploded view of the assembly in FIGS. 19-20. As shown, the pivot arm 216 is assembled using the leveling bolt and the stud nut 299. The hex nut 274 on the leveling bolt 270 keeps the leveling bolt 270 from rotating within the pivot arm 216. Once the barrel nut 320 is fully inserted through the cavities 201 and 201A, the barrel nut drive head 330 is inserted into the top of the barrel nut 320. FIG. 22 shows a side view of the completed assembly with two solar panel modules 500 inserted into the clamp 210 and the barrel nut drive head 330 inserted into the top of the barrel nut 320. As shown, the barrel nut 320 has been placed on top of the leveling bolt 270.

Figure 23:
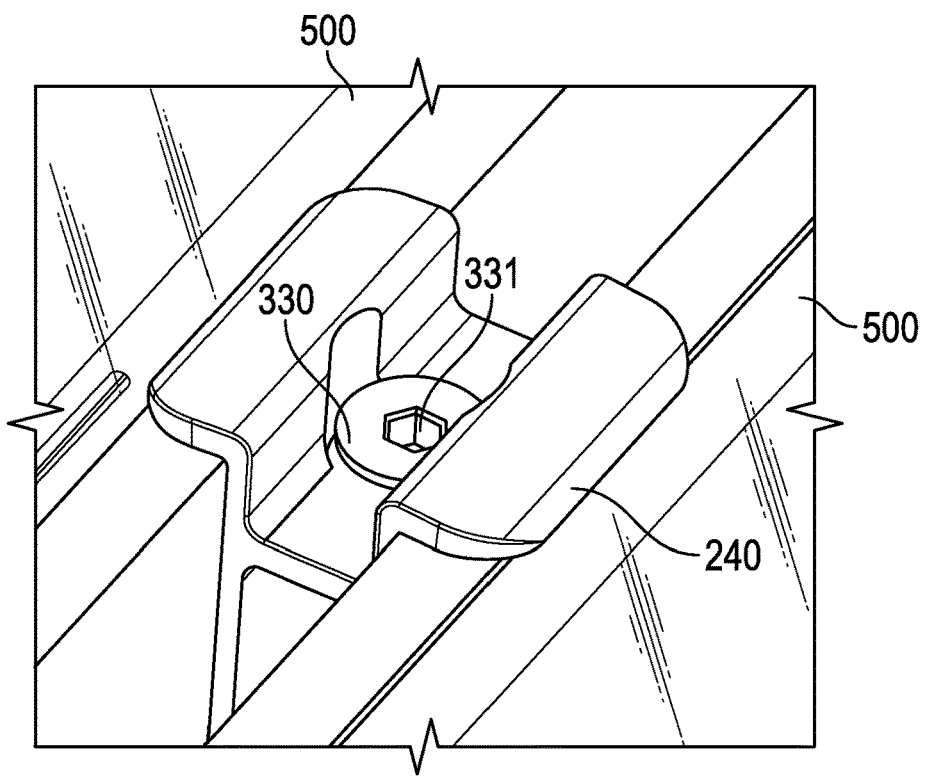
FIG. 23 illustrates a perspective detailed view of the top of the clamp showing the barrel nut drive head as shown in FIG. 22.

FIG. 23 illustrates a perspective detailed view of the top of the clamp 210 showing the barrel nut drive head 330 with its allen drive 331. In this embodiment, the clamp 210 is vertically adjusted along the leveling bolt 270 by rotating the allen drive 331 in the barrel nut drive head 330 in a clockwise or counterclockwise direction depending on whether the clamp 210 needs to be lowered or raised respectively. Although an allen drive 331 is used in this embodiment, other suitable drive heads can be used within the barrel nut drive head 330 as well.

Figure 24:
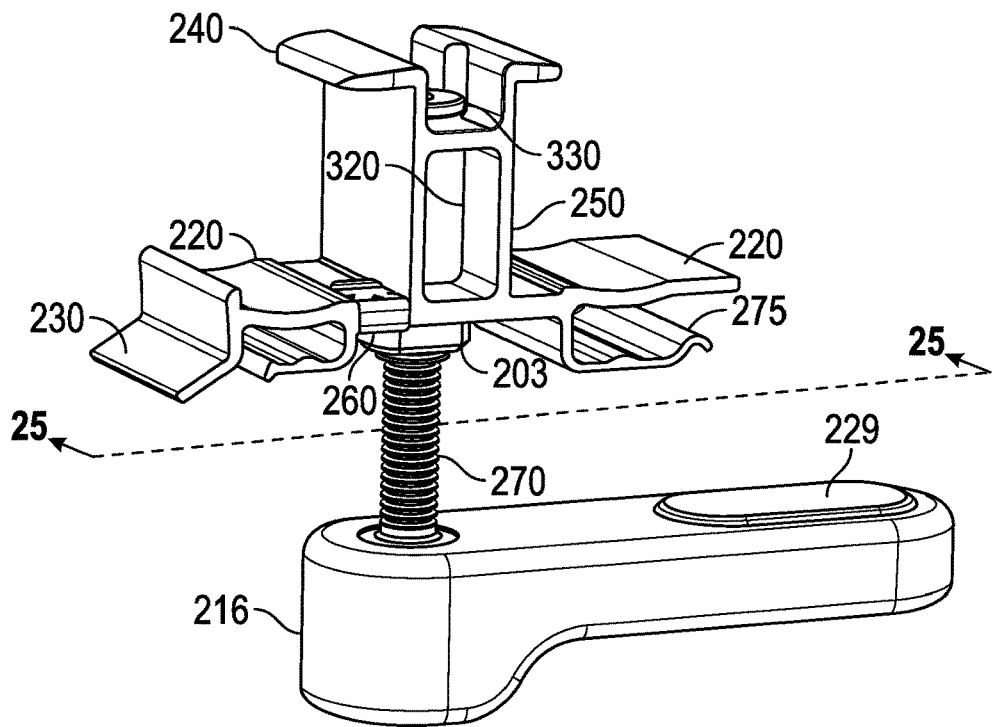
FIG. 24 illustrates a side view of the assembly as shown in FIGS. 19-23.
Figure 25:
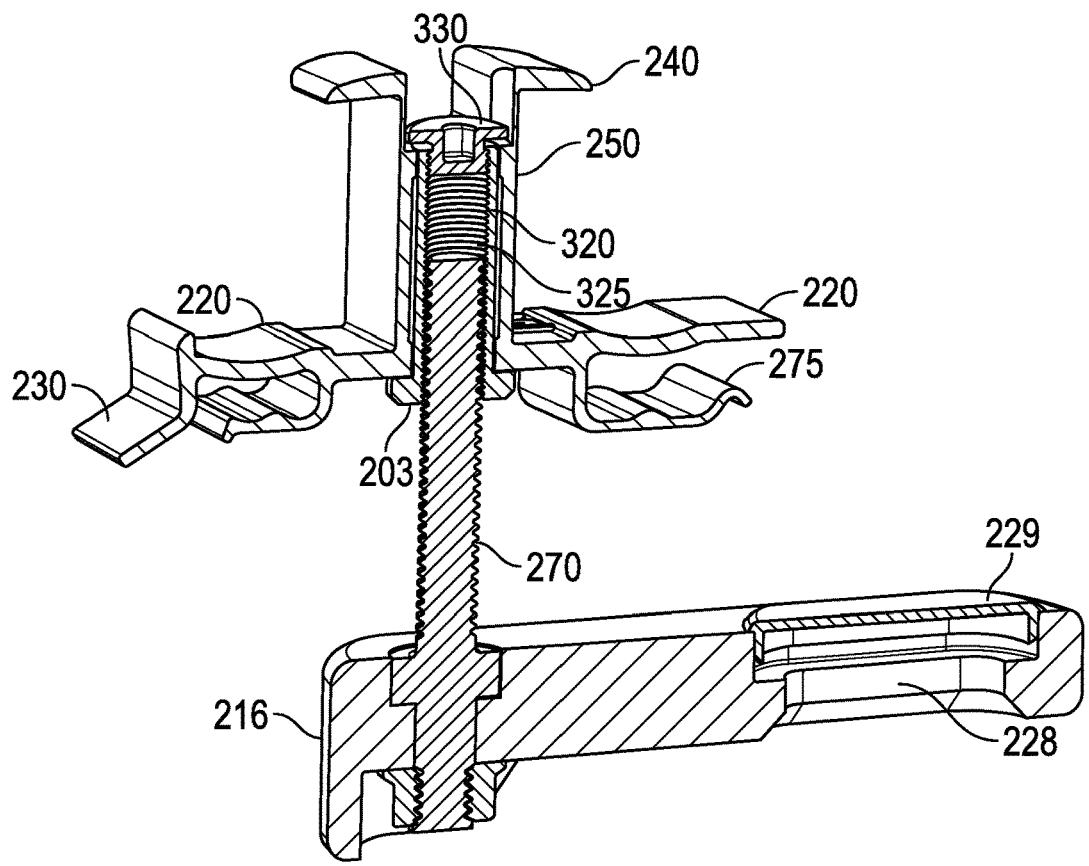
FIG. 25 illustrates a cross-sectional view of the embodiment in FIG. 24.
Figure 26:
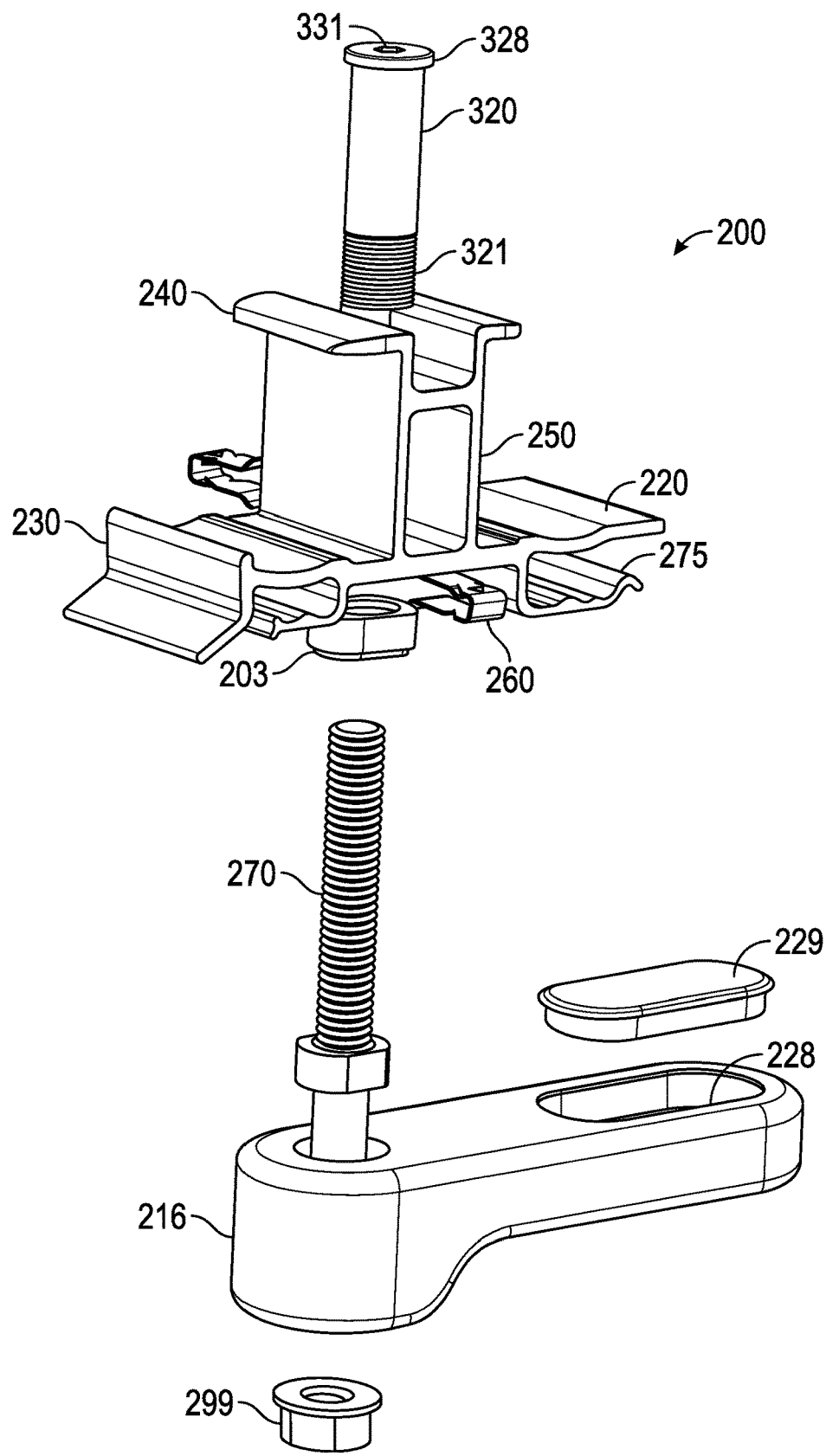
FIG. 26 illustrates an exploded view of the embodiment shown in FIGS. 24-25.
Figure 27:
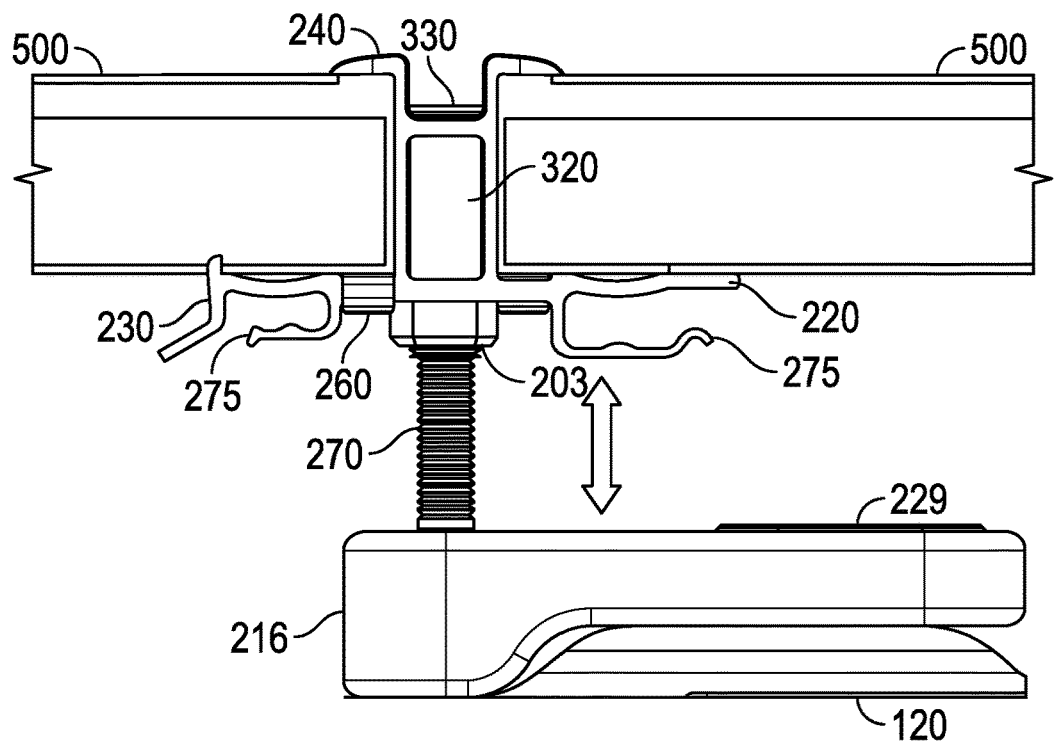
FIG. 27 illustrates a side view of the completed assembly with two solar panel modules inserted into the clamp and the barrel nut drive head inserted into the top of the barrel nut.
Figure 28:
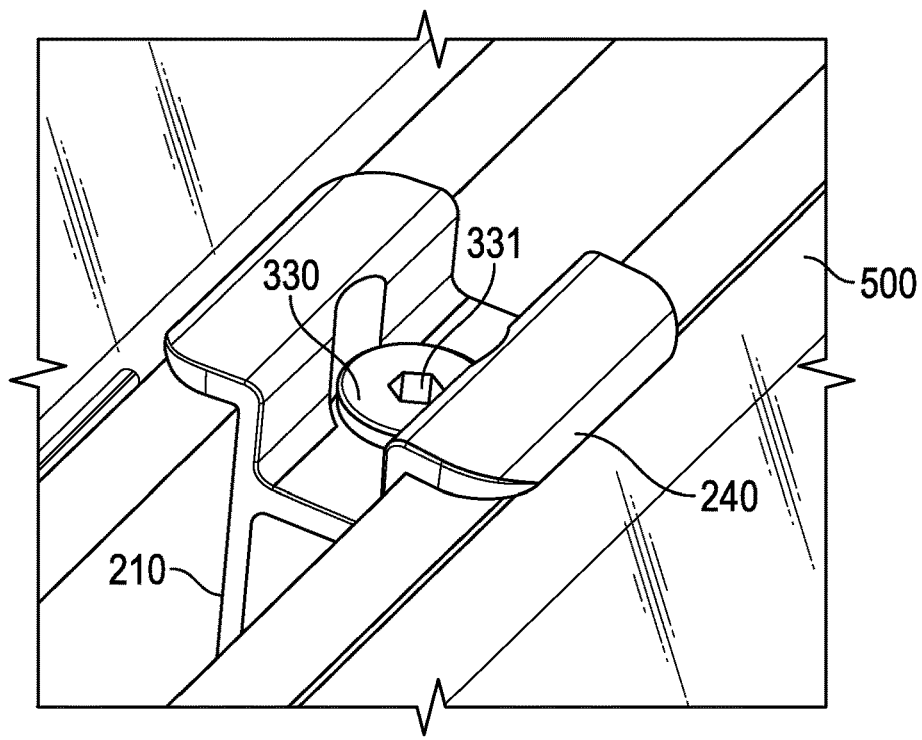
FIG. 28 illustrates a perspective detailed view of the top of the clamp showing the barrel nut drive head with its allen drive of FIG. 27.

FIGS. 24-28 provide another exemplary embodiment of the assembly 200. FIG. 24 shows a side view of the assembly 200 and FIG. 25 is a cross-sectional view of the embodiment in FIG. 24. FIG. 24 includes a pivot mount cap 229. FIG. 26 is an exploded view of the embodiment shown in FIGS. 24-25. FIG. 27 shows a side view of the completed assembly with two solar panel modules 500 inserted into the clamp 210 and the barrel nut drive head 330 inserted into the top of the barrel nut 320. As shown, the barrel nut 320 has been placed on top of the leveling bolt 270. FIG. 28 illustrates a perspective detailed view of the top of the clamp 210 showing the barrel nut drive head 330 with its allen drive 331. This embodiment provides all of the features identified in FIGS. 19-23. But in this embodiment, the barrel nut 320 includes threads 321 on the outer surface of the nut 320 with an integrated barrel drive 328 with allen drive 331. In this embodiment, the barrel nut is inserted downward through the cavities 201 and 201A. The barrel nut 320 is then rotated at the barrel drive 328 around a threaded retaining nut 203. The threads 325 within the barrel nut 320 provide vertical movement of the barrel nut 320 so that the clamp 210 can move up or down depending on which way the barrel nut 320 is rotated.

Figures 29, 30:
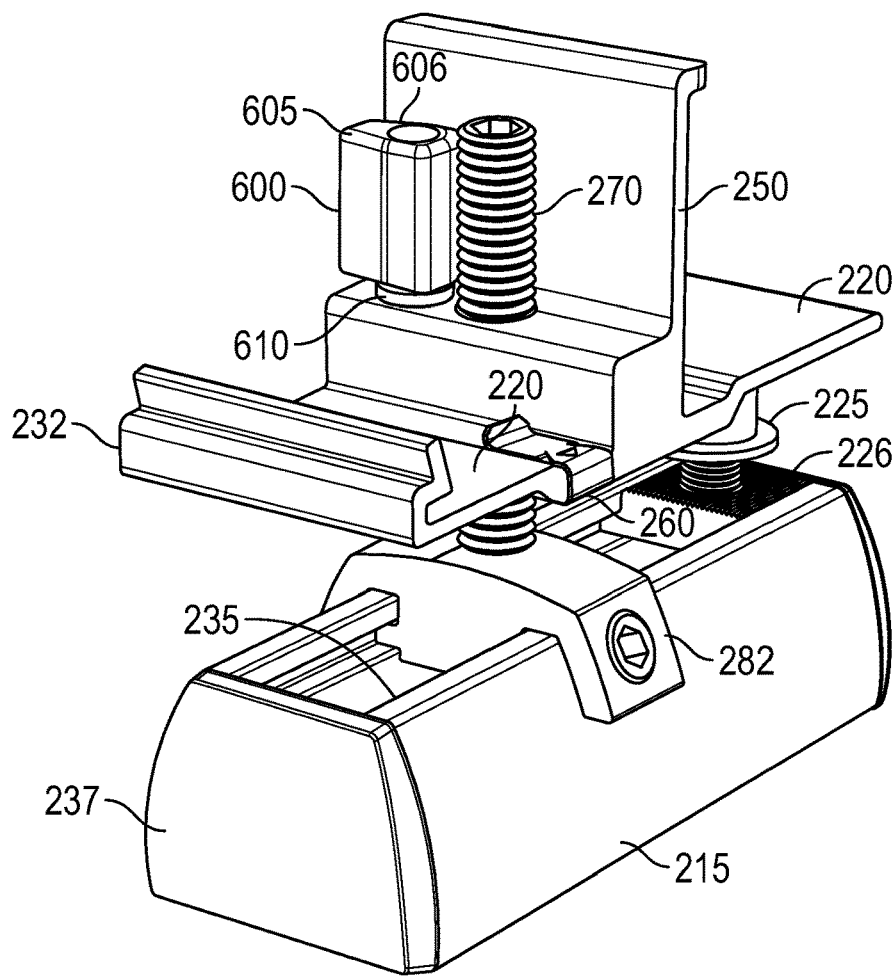
FIG. 29 illustrates a front perspective view of an alternate embodiment of a rail-less assembly.
FIG. 30 illustrates a perspective view of an exemplary splice demonstrating a similar use of the cam lock as shown in FIG. 29.
Figure 31:
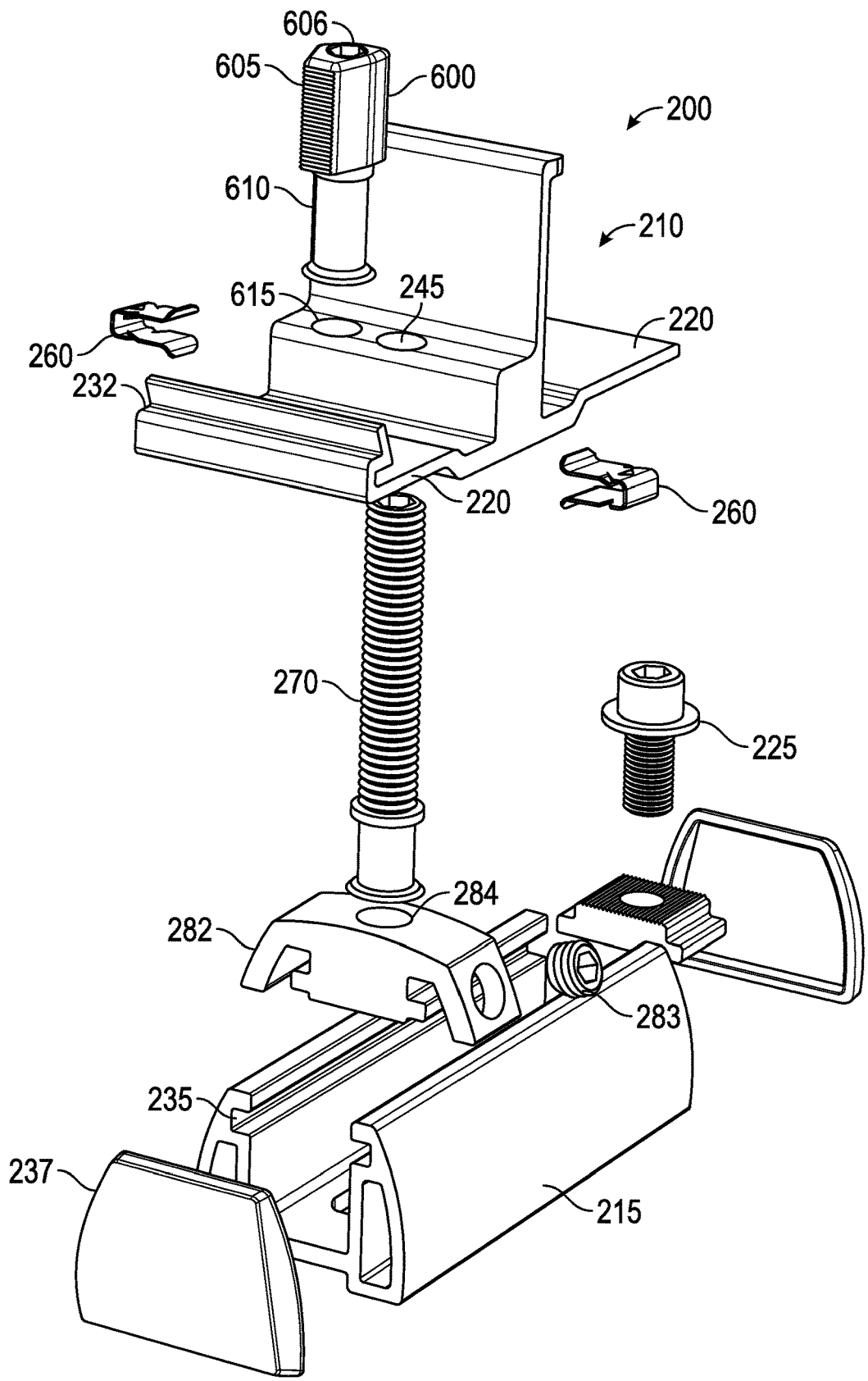
FIG. 31 illustrates an exploded view of the embodiment in the assembly of FIG. 29.

FIGS. 29-34 shows an alternate exemplary embodiment of the assembly 200 illustrated in FIGS. 5 and 7. FIG. 29 shows a front perspective view of the assembly 200 and FIG. 31 shows an exploded view of the embodiment in FIG. 29. In this embodiment, a leveling bolt mount 282 is shown. The leveling bolt mount 282 fits within the slot 235 and moves linearly along the pivot rail 215. The leveling bolt mount 282 is secured by a threaded nut 283 as shown in FIG. 31. The leveling bolt mount 282 receives the leveling bolt 270 in the hole 284 as shown.

In this embodiment, the clamp 210 includes an alternate means to secure the array skirts 140 or solar panel modules 500. As shown, the mounting plate 220 comprises an inlet 232 on its north side and a rotating cam lock 600 is positioned on a cylinder 610 through a cylindrical void 606. The cam lock 600 includes an extended front end 605. The cylinder 610 is coupled to the mounting plate 220 in the middle portion of the mounting plate 220 within the hole 615. The leveling bolt 270 is secured to the clamp 210 through the cavity 245 as it was in the embodiment shown in FIGS. 5 and 7.

Figure 32:
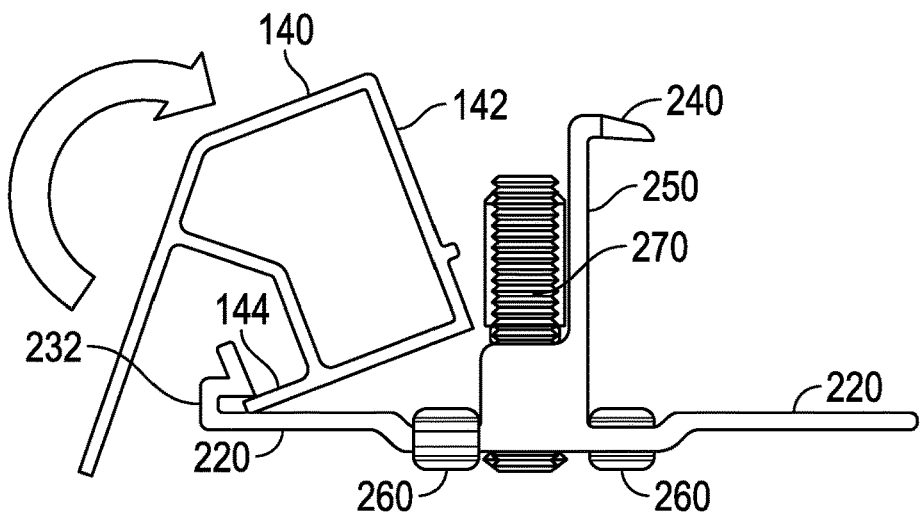
FIG. 32 illustrates a side view of the assembly illustrated in FIGS. 29 and 31.
Figure 33:
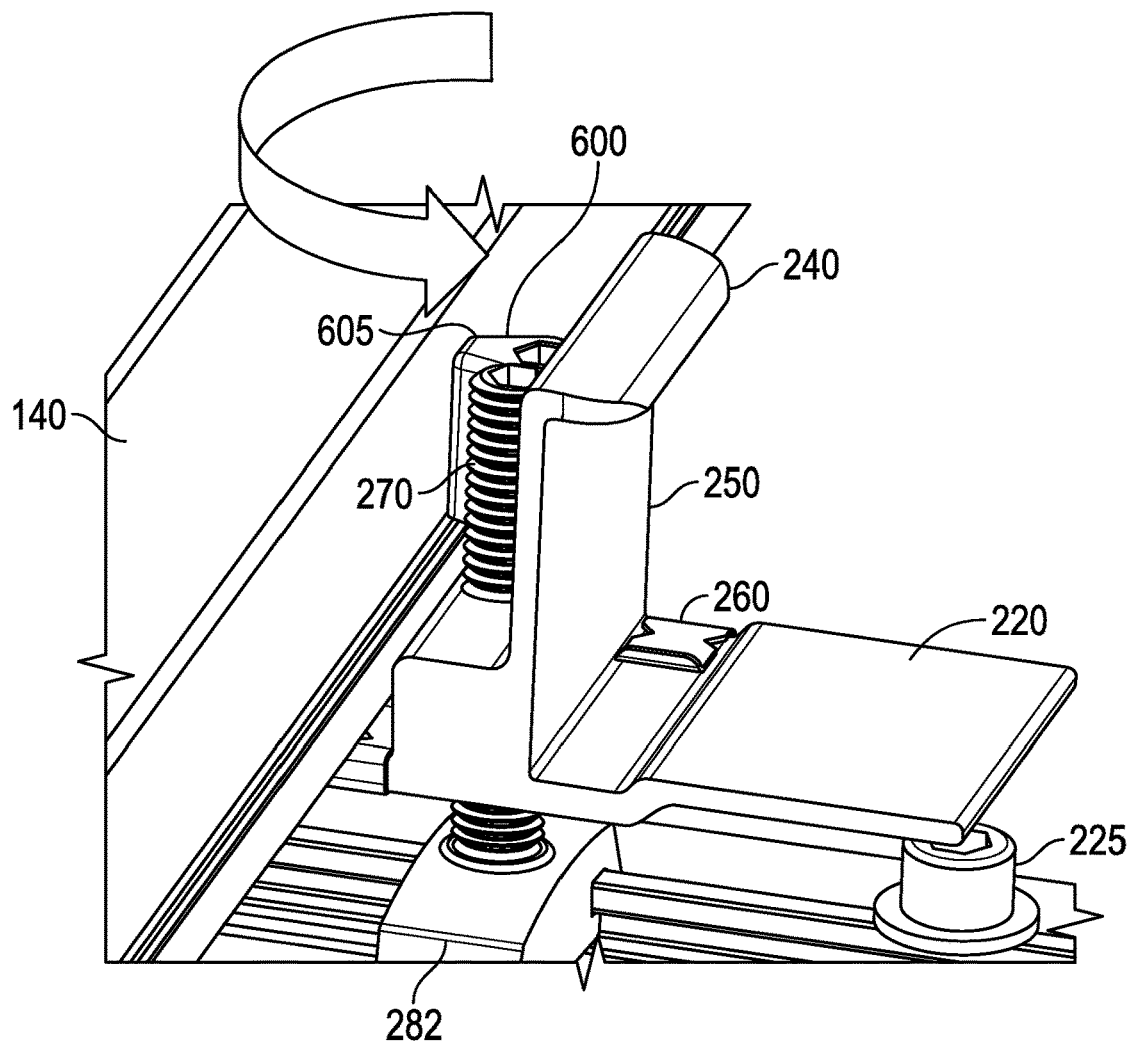
FIG. 33 illustrates a more detailed perspective view of how the cam lock functions in FIG. 29.

FIGS. 32 and 33 show how the cam lock 600 is used to secure an array skirt 140. FIG. 32 shows a side view of the assembly 200 illustrated in FIGS. 29 and 31 and FIG. 33 shows a more detailed perspective view of how the cam lock 600 functions. The array skirt 140 installed by inserting the plate 144 into the inlet 232 and then rotating it into position as shown in FIG. 32. Initially, the cam lock 600 is positioned in the unlocked position, which means the extended end 605 is parallel to the wall 250. After the array skirt 140 is fully rotated into position as shown in FIG. 33, the cam lock 600 is rotated counterclockwise so that the extended end 605 engages the rear wall 142 of the array skirt 140 and pushes it outward so that the array skirt 140 is inserted into the inlet 232 and locked in place. At this point, the cam lock 600 is in the locked position, which means the extended end 605 is perpendicular to the wall 250 of the clamp 210. The bonding clip 260 penetrates the outer surface of the array skirt 140 and creates an electrical path between the array skirt 140 and the other components in the array 100 through the assembly 200.

Figure 34:
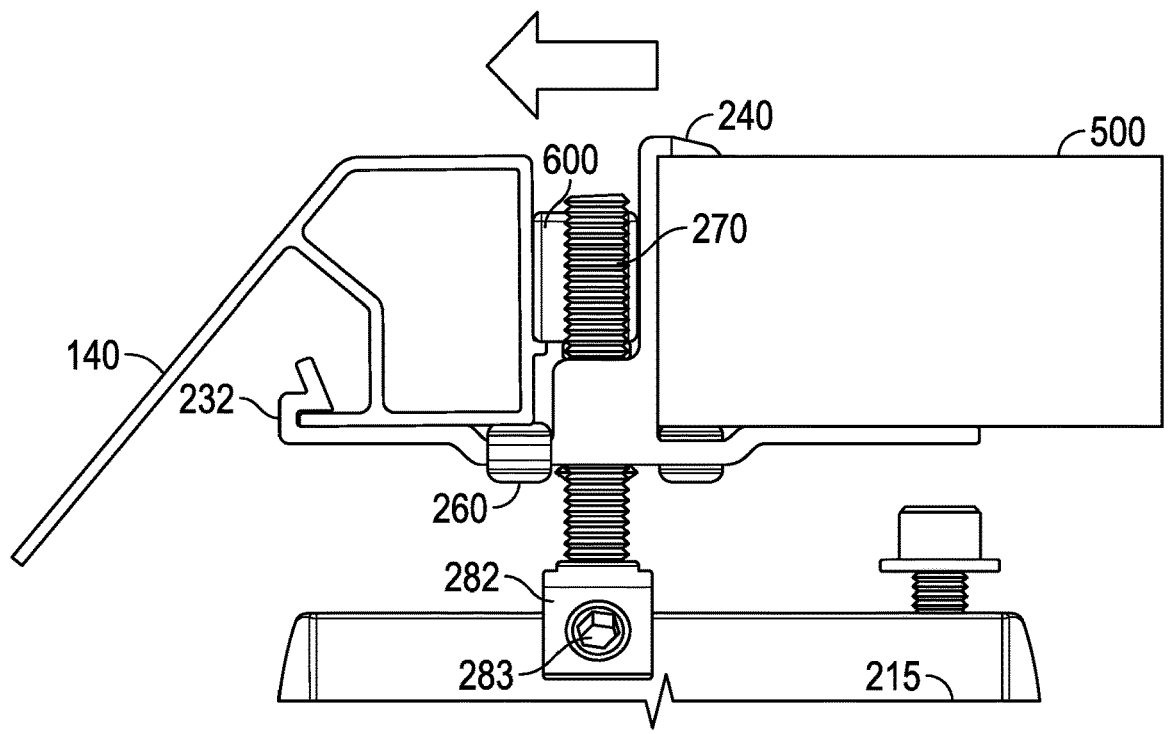
FIG. 34 illustrates a side view of a completed installation of the embodiment in FIGS. 29-33.

FIG. 30 illustrates a perspective view of an exemplary splice 300 demonstrating a similar use of the cam lock 600. As shown in FIG. 30, the splice 300 has a similar design to that of the clamp shown in FIGS. 29 and 31. The splice 300 includes inlets 332 and the bonding clips 360. In this embodiment, a pair of cam locks 600 are positioned on opposite ends of the middle portion of the mounting plate 319 as shown. The cam locks 600 each include an extended front end 605. A cylinder 610 is coupled to the mounting plate 319 in the middle portion of the mounting plate 319 within the holes 615. The same steps are utilized in order to join two array skirts 140 or two solar panel modules 500. They are inserted into the inlets 332 while the cam locks 600 are in the unlocked position, and then the cam locks 600 are rotated into the locked position to lock the array skirts 140 or the solar panel modules 500 into place. Alternatively, one side of the splice 300 can have no bonding pins 365 or clips 360. This allows the solar panel modules 500 on that side to move freely, which allows the modules 500 to account for thermal expansion and allow the installer of the array 100 to adjust the modules 500 in case they are not properly aligned. FIG. 34 shows a side view of a completed installation of the embodiment in FIGS. 29-33 showing the array skirt 140 and a solar panel module 500 installed. In this embodiment, the solar panel module 500 is installed on the north side of the clamp 210 and is simply inserted into the clamp 210 so that the module 500 rests on top of the mounting plate 220 and beneath the flange 240. The clamp 210 is vertically adjusted by rotating the leveling bolt 270.

Figure 35:
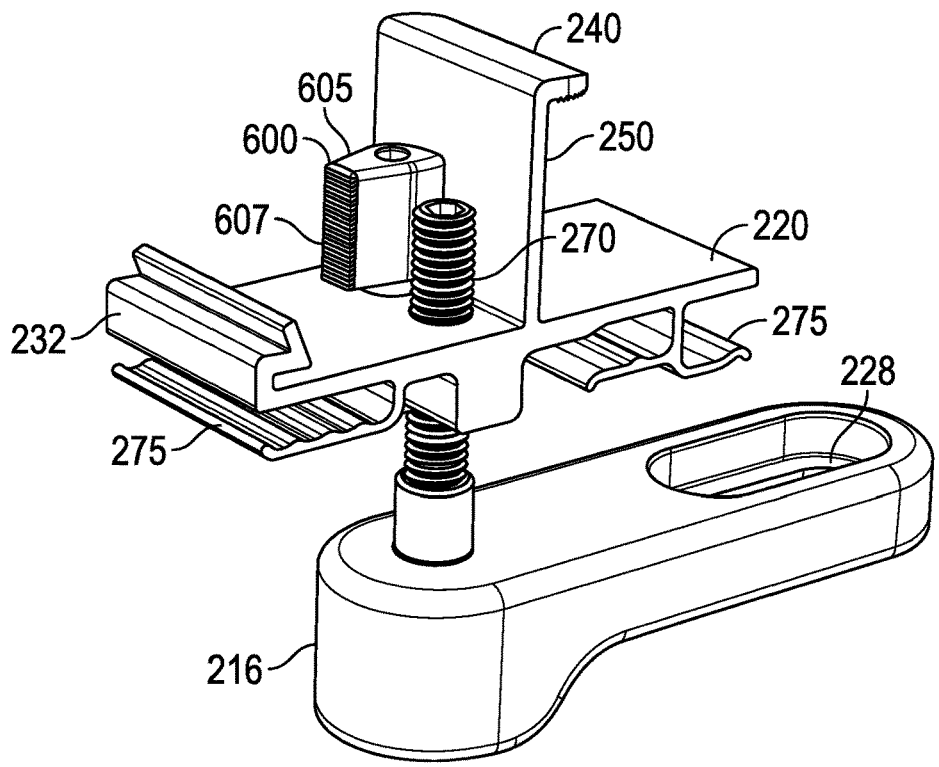
FIG. 35 illustrates a perspective view of an alternate exemplary embodiment of the assembly shown in FIGS. 29-34.
Figure 36:
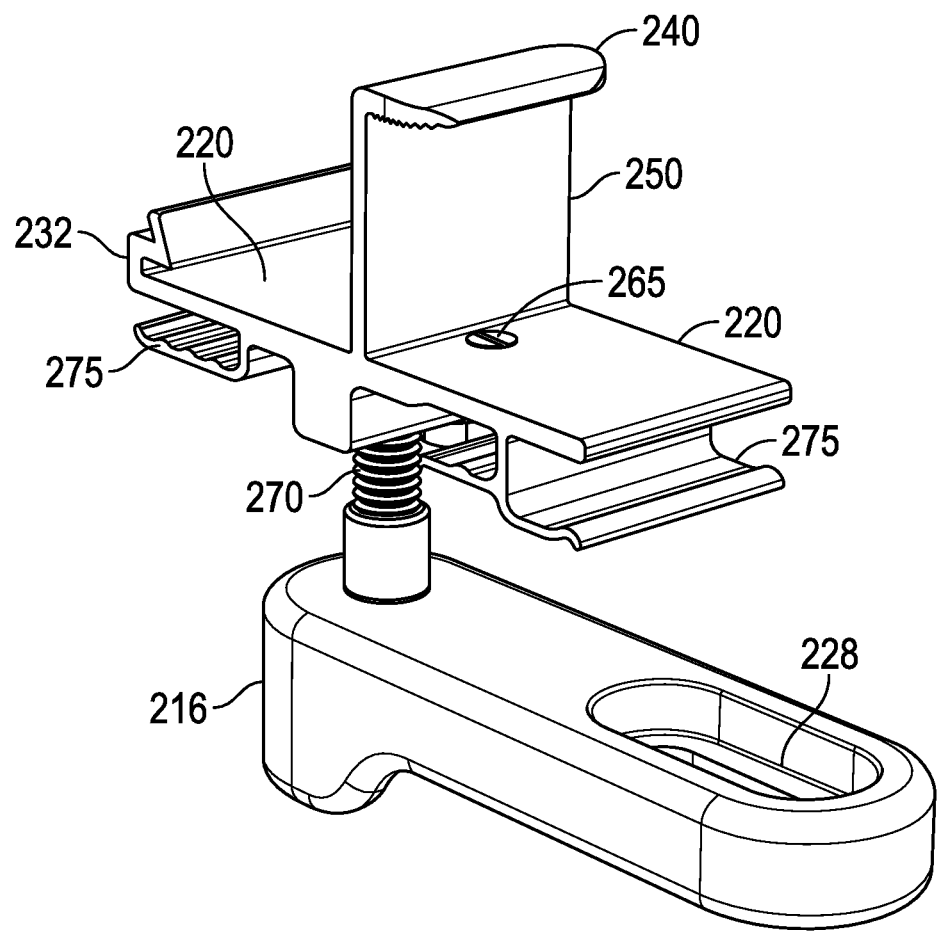
FIG. 36 illustrates a rear perspective view of the assembly shown in FIG. 35.

FIGS. 35-41 show an alternative exemplary embodiment of the assembly shown in FIGS. 29-34. FIG. 35 shows a perspective view of the assembly 200. In this embodiment, the cam lock 600 includes raised portions 607 on the extended front end 605 used to penetrate the outer surface layer of an array skirt 140 or a solar panel module 500. A conduit 275 is included to provide wire management features as shown in the embodiment discussed in FIGS. 12-16. Additionally, the pivot arm 216 is used instead of the pivot rail 215. FIG. 36 shows a rear perspective view of the assembly. In this view, a bonding pin 265 is utilized on the north end of the mounting plate 220 instead of the bonding clip 260.

Figure 37:
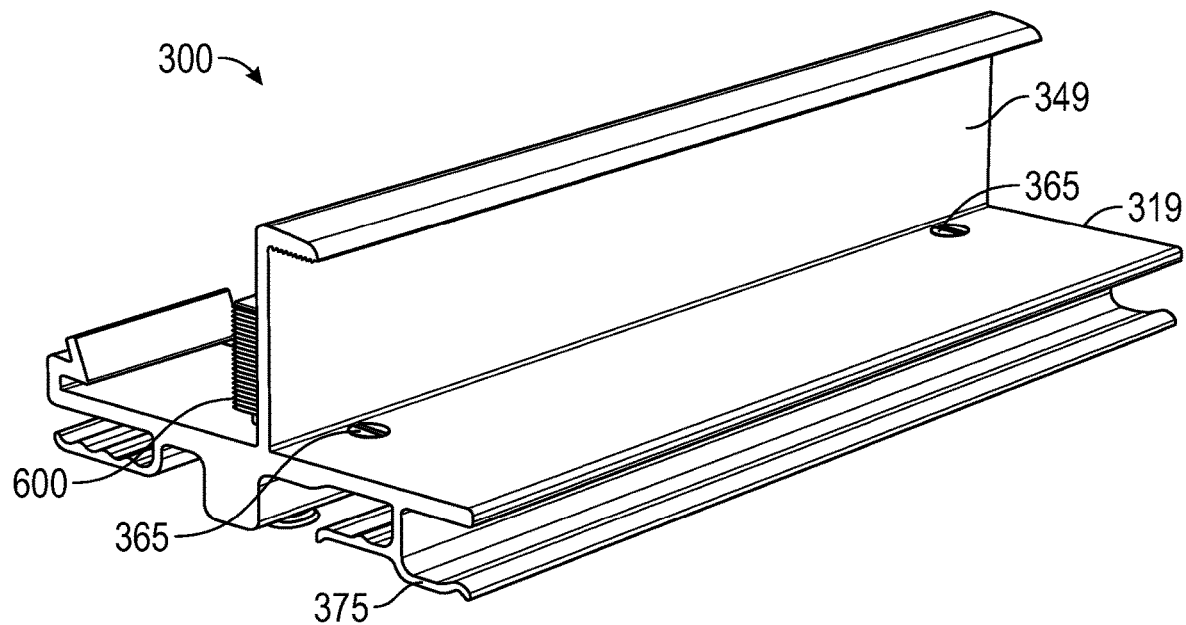
FIG. 37 illustrates a rear perspective view of an alternate embodiment of the splice shown in FIG. 30.
Figure 38:
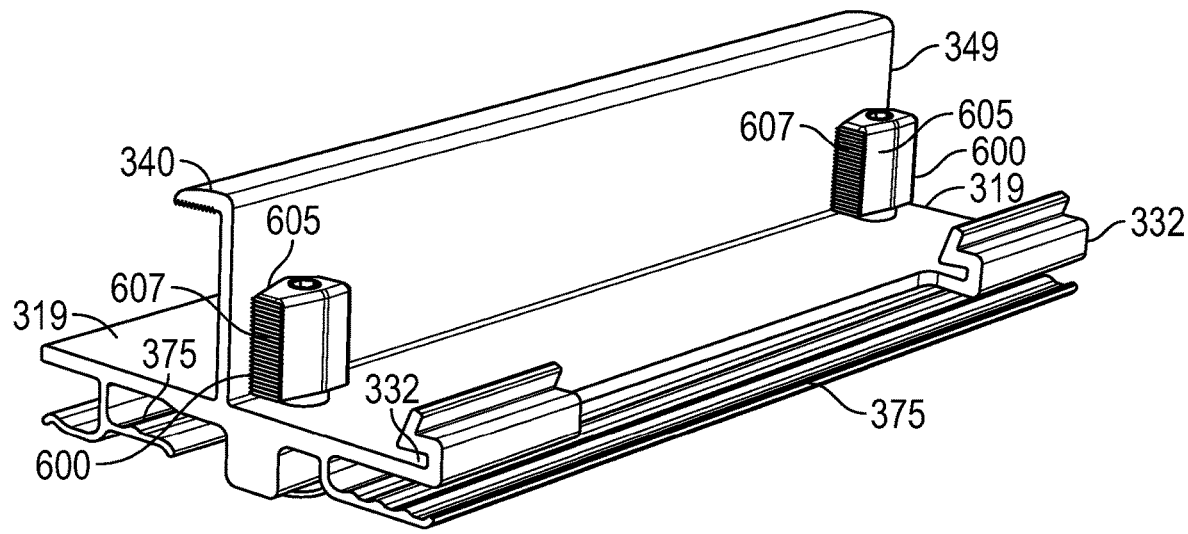
FIG. 38 illustrates a front perspective view of an alternate embodiment of a splice.

FIGS. 37 and 38 show front and rear perspective views of an alternate embodiment of the splice shown in FIG. 30. In this embodiment, like the cam lock 600 used in FIG. 35, two cam locks 600 are shown in FIG. 38 in the unlocked position on the south side of the mounting plate 319 and assembled in the same fashion as the cam locks that were assembled in the embodiment described in FIG. 30. These cam locks 600 include the raised portions 607 on the extended end 605. As shown in FIG. 37, a pair of bonding pins 365 are included on the north side of the mounting plate 319. The bonding pins include the raised portions on the head of each of the pins 365 as used on the pins 265.

Figure 39:
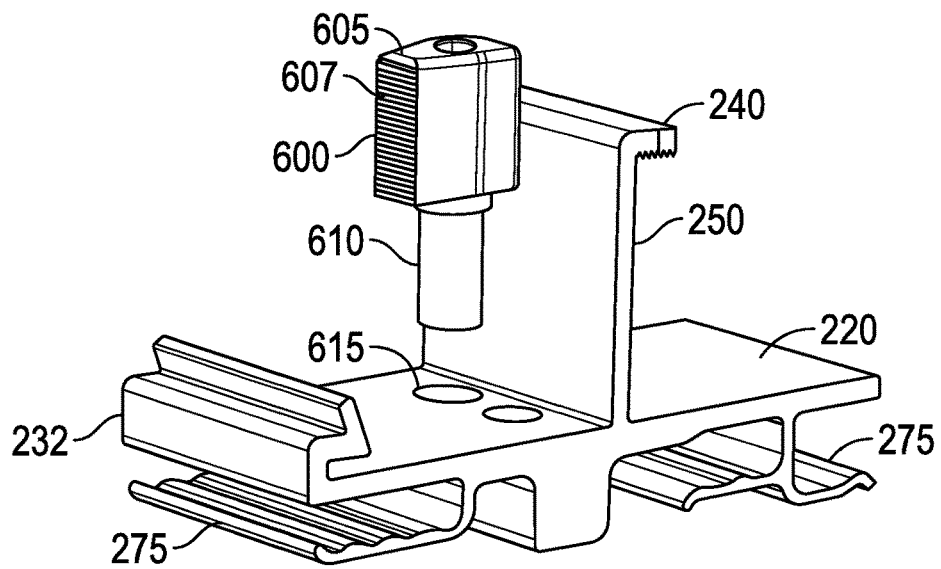
FIG. 39 illustrates an exploded view of the assembly as shown in FIGS. 35 and 36.
Figure 39:
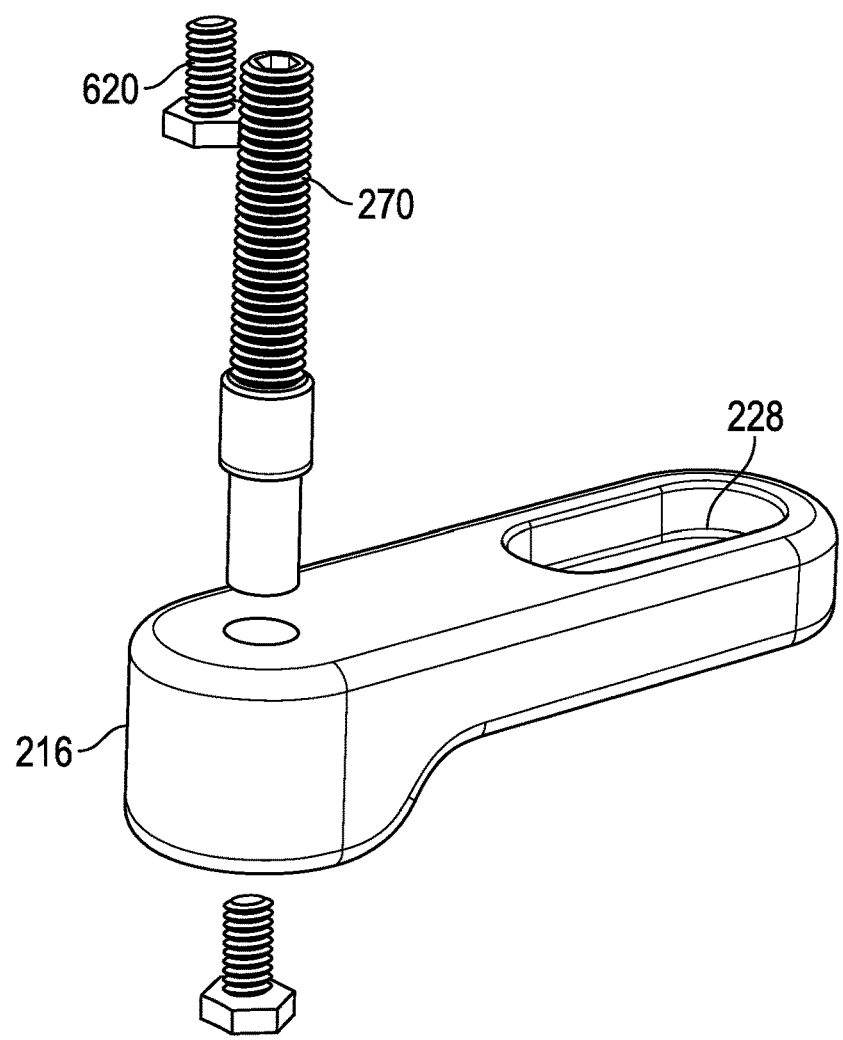

FIG. 39 shows an exploded view of the assembly 200 as shown in FIGS. 35 and 36. As shown, the cam lock 600 is assembled on to the mounting plate 319 by inserting cylinder 610 through the hole 615. The cylinder 610 is secured to the mounting plate 319 by threading the cam lock retaining bolt 620 into the cylinder 610. The cam lock 600 is inserted over the cylinder 610, which allows the cam lock 600 to rotate around the cylinder 610 as needed.

Figure 40:
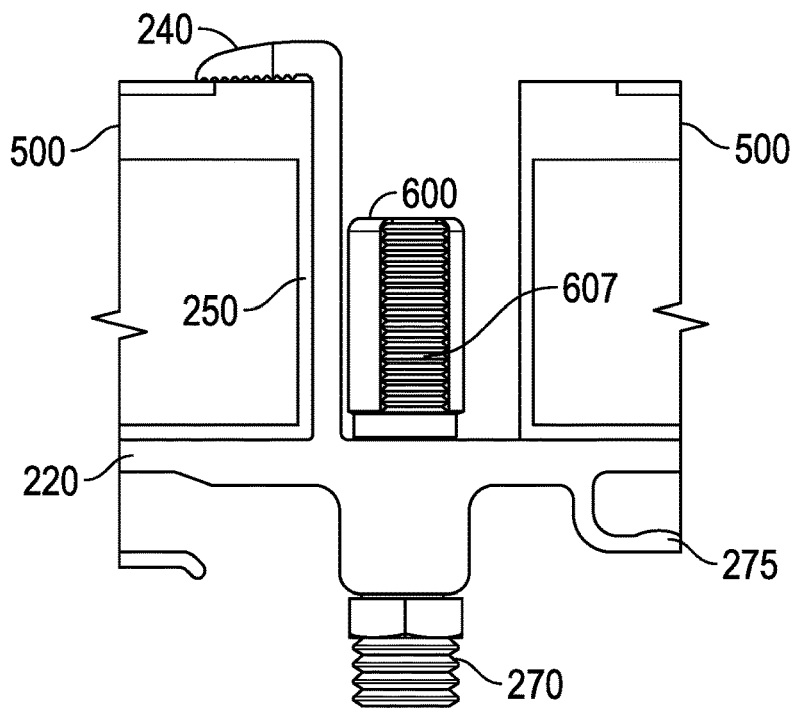
FIG. 40 illustrates a side view of the assembly shown in FIGS. 35-36 with a solar panel module having been inserted into position with the cam lock in the unlocked position.
Figure 41:
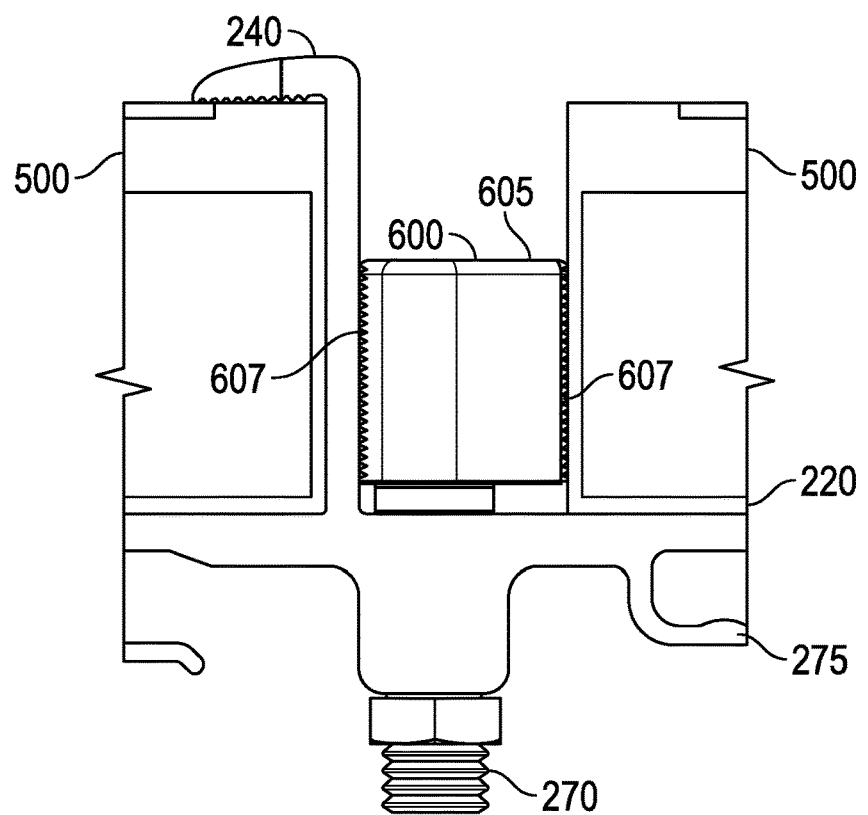
FIG. 41 illustrates a side view of FIG. 40 with the cam lock in the locked position.

FIGS. 40 and 41 show a side view of the assembly 200 of FIGS. 35-39. FIG. 40 shows a solar panel module 500 having been inserted into position with the cam lock 600 in the unlocked position, while FIG. 41 shows a side view of FIG. 40 with the cam lock 600 in the locked position. The figures show that when the cam lock 600 is rotated into the locked position, the raised portions 607 engage, and penetrate the outer surface layer of the solar panel module 500. As shown, the raised portions 607 can be on the extended end 605 as well as the end opposite the extended end 605 of the cam lock 600. This enables the cam lock to penetrate the outer surface layer of the rear wall 250 of the clamp as well. By doing so, the cam lock 600 secures the solar panel module 500 within the mounting plate 220 and creates an electrical bonding path from the solar panel module 500 to the rest of the array 200 by way of the assembly 200. The same actions can be taken on the splice 300 so that two array skirts 140 or solar panel modules 500 can be joined together and locked into place by the cam locks 600.

Figure 42:
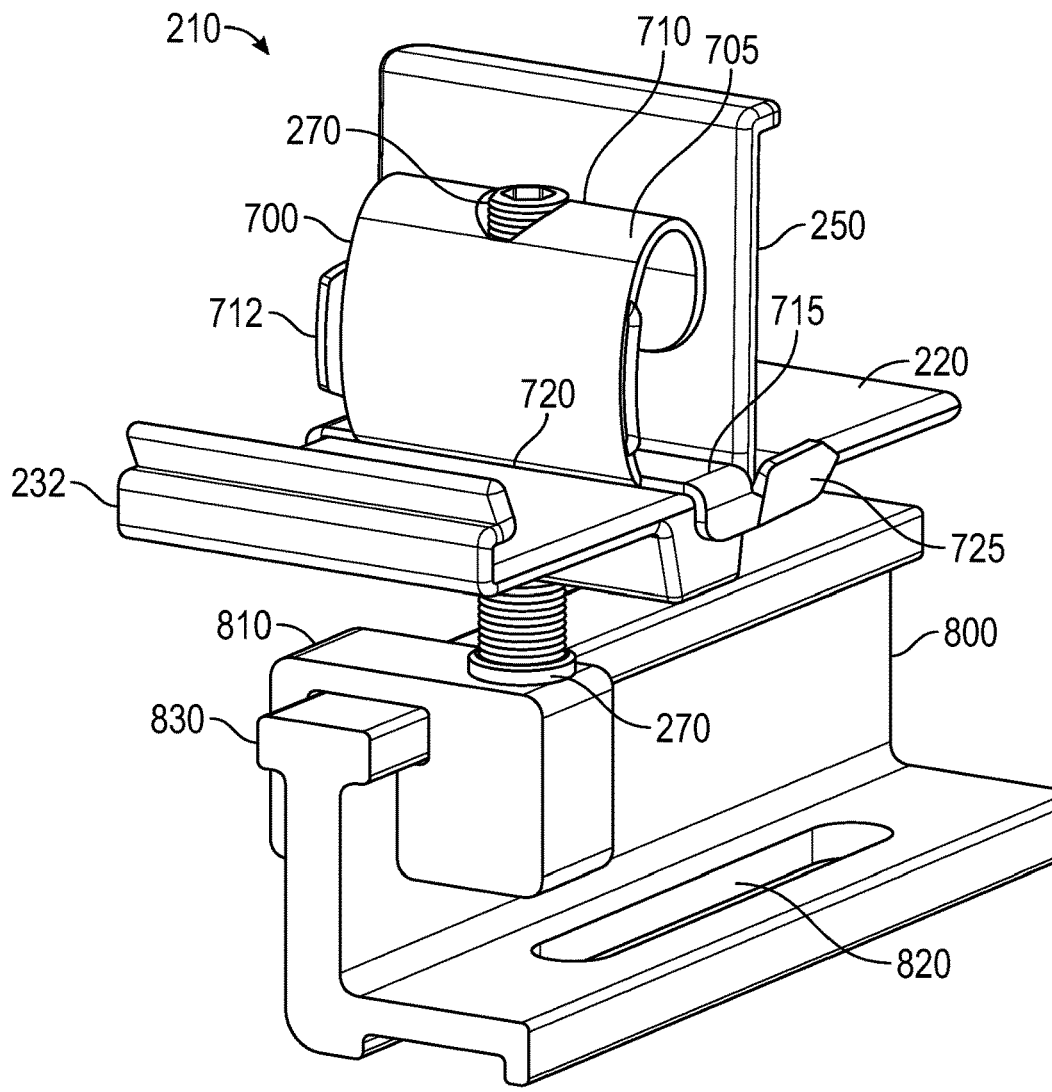
FIG. 42 illustrates a perspective view of an exemplary assembly that utilizes spring locks.
Figure 43:
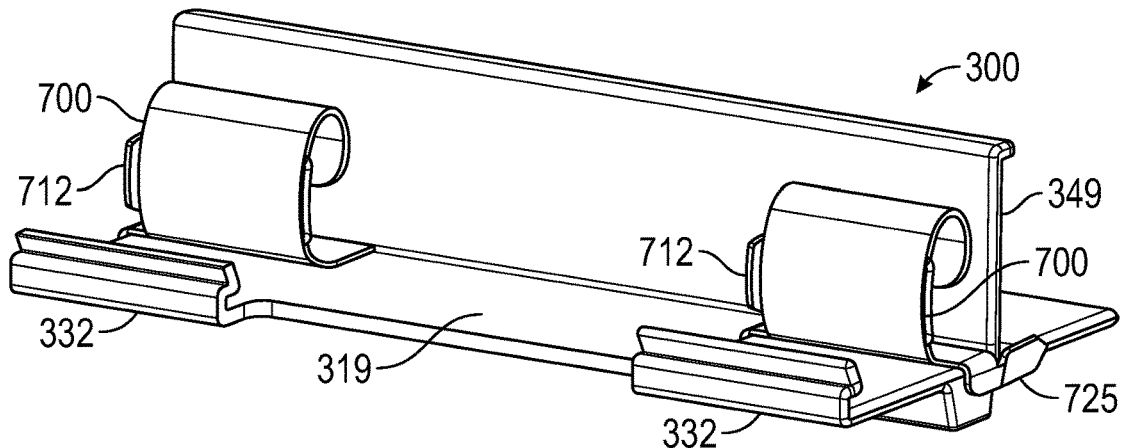
FIG. 43 illustrates a perspective view of an exemplary embodiment of a splice utilizing spring locks.
Figure 44:
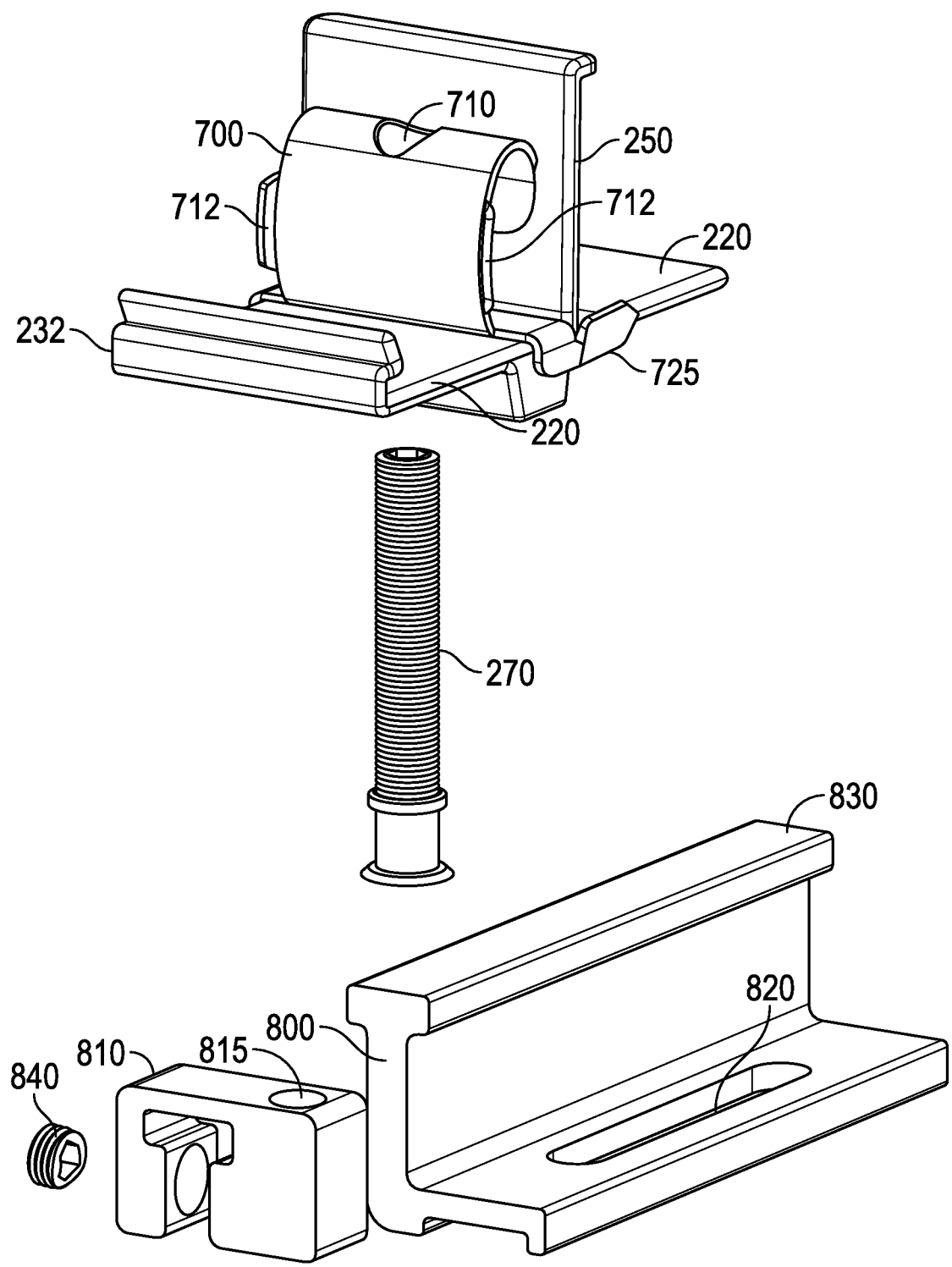
FIG. 44 shows an exploded view of the assembly as shown in FIG. 42.

FIGS. 42-47 show another exemplary embodiment of a pivot mount assembly that utilizes a spring lock and a splice that also uses the same spring lock design. FIG. 42 shows a perspective view of an exemplary assembly and FIG. 44 shows an exploded view of the assembly as shown in FIG. 42. A pivot rail 800 is shown. The pivot rail 800 includes a slot 820. The slot 820 receives the bolt 125 from the flashing 120 and allows the pivot rail 800 to move linearly along the slot 820. A leveling bolt mount 810 is also provided. The leveling bolt mount 810 is secured to a top guide 830 by using the threaded bolt 840 as shown in FIG. 44. The leveling bolt mount 810 can be moved linearly along the guide 830 and positioned where desired. The leveling bolt 270 is secured within the hole 815.

The clamp 210 resembles that of the clamp embodiment in FIGS. 29 and 31. It is similar in many aspects except that a spring lock 700 is provided. An exemplary spring lock 700 is a resilient, electrically conductive sheet, and is formed into a generally c-shaped configuration. The spring lock 700 includes an upper end 705 with an upper opening 710 and a lower end 715 with lower opening 720. The lower end includes a bonding clip 725. The lower end 715 of the spring lock 700 is secured to the lower portion of the mounting plate 220 such that the bonding clip 725, which also includes raised portions, is affixed to the north side of the mounting plate 220. The side of the spring lock 700 includes raised portions 712 capable of penetrating an outer surface layer of the array skirt 140 or the solar panel module 500.

Figure 45:
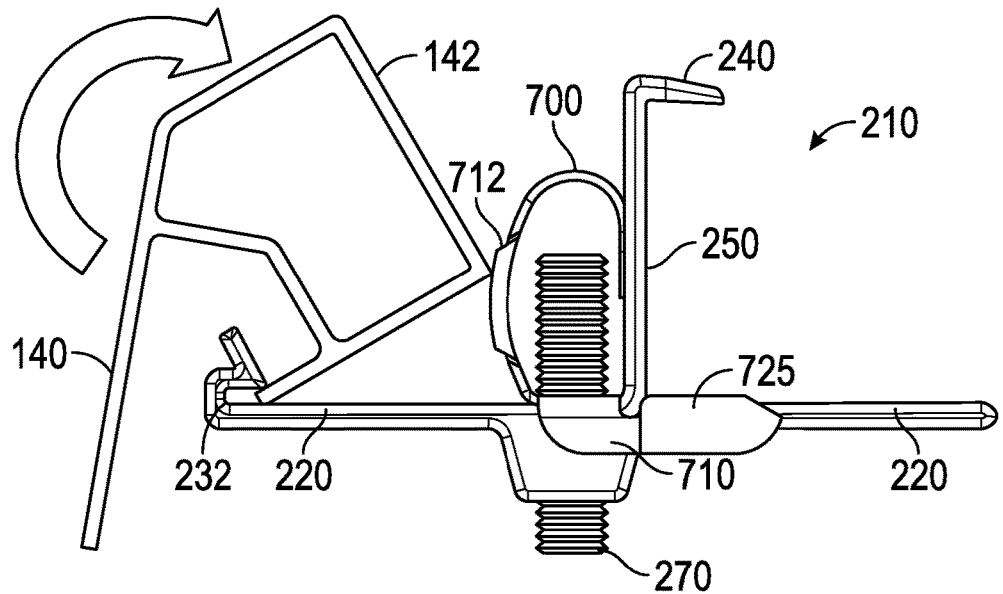
FIG. 45 illustrates a side view showing the step of installing an array skirt in the assembly shown in FIGS. 42 and 44.
Figure 46:
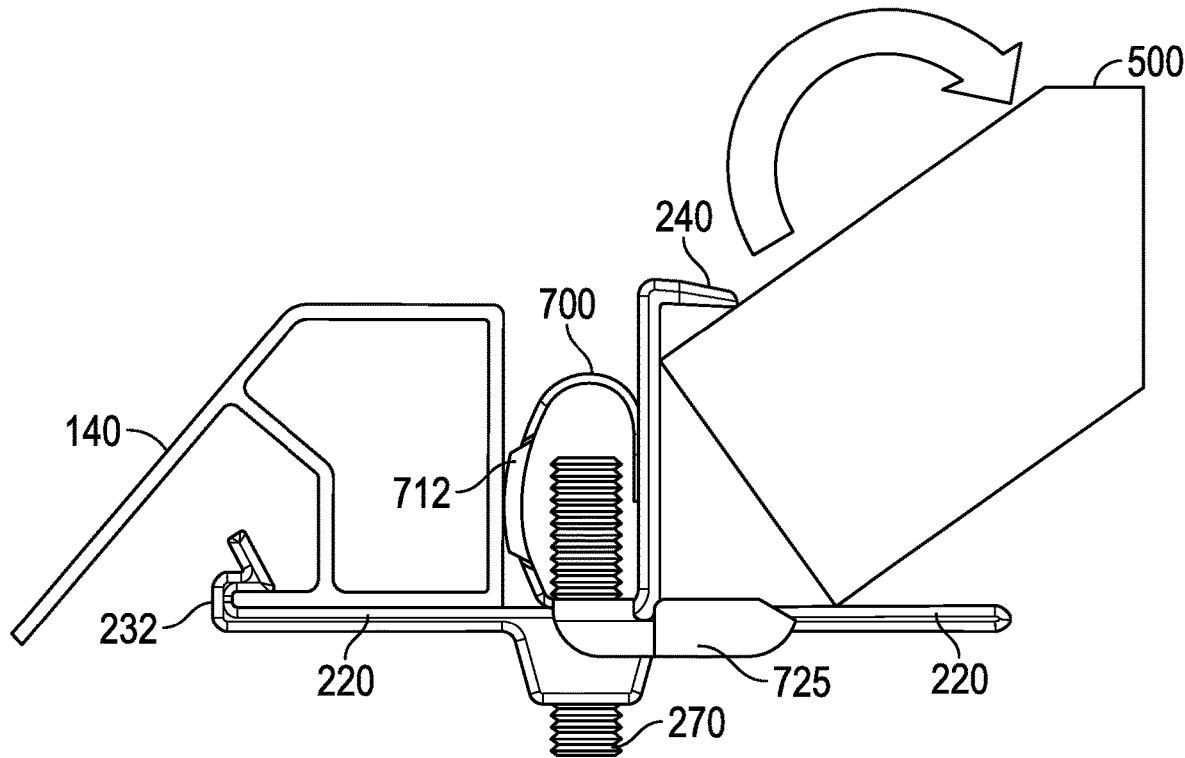
FIG. 46 illustrates a side view showing the step of installing the solar panel in the assembly shown in FIGS. 42 and 44.
Figure 47:
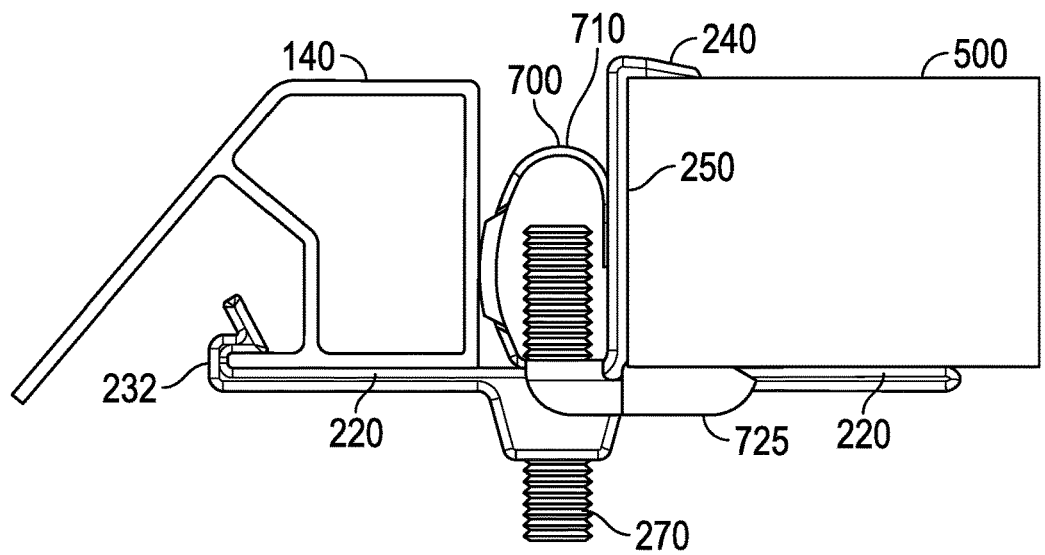
FIG. 47 illustrates a side view of a completed installation of the array skirt and the solar panel module in the assembly shown in FIGS. 42 and 44.

FIG. 45 and FIG. 46 show the steps of installing the solar panel array 100. The first step for this embodiment involve inserting the array skirt 140 on the south side of the clamp 210 by rotating it into position once the extension plate 144 is set into the inlet 232. The tension in the spring lock 700 applies a positive force to the rear wall 142 of the array skirt 140, which locks it into place in the clamp 210. The positive force allows the raised portions 712 to penetrate the outer surface layer of the rear wall 142 of the array skirt 140. The solar panel module 500 is then inserted on the north side of the clamp 210 by rotating it into place as shown in FIG. 46. As the module 500 is rotated into place, the module 500 pushes down on the bonding clip 725, which in turn penetrates the bottom surface of the module 500 and raised portions located on the top of the clip 725, penetrate the outer surface layer of the module 500 and create an electrical path to the pivot rail 800. FIG. 47 shows a completed installation of the array skirt 140 and the solar panel module 500.

FIG. 43 illustrates an exemplary embodiment of a similar splice 300 shown in FIG. 30 without the cam locks 600. The splice 300 includes a pair of spring locks 700. The spring locks 700 utilized with the splice 300 have the same features as those used with the clamp 210 except the upper and lower openings 710 and 720 respectively are not necessary. The spring locks 700 are secured to opposite ends of the splice 300 with the bonding clip 725, which further comprises a raised portion capable of penetrating an outer surface layer of the solar panel module 500, is affixed to the north side of the splice 300. The splice 300 is assembled in a similar fashion to that of the clamp 210 shown in FIGS. 45-47, except two array skirts 140 are joined on the south side of the mounting plate 319 such that the raised portions 712 penetrate the outer surface layers of a pair of array skirts 140, and likewise, a pair of solar panel modules 500 are joined on the north side of the mounting plate 319 and are installed so that the raised portions on the binding clip 725 penetrate the outer surface layers of the solar panel modules 500.

Figure 48:
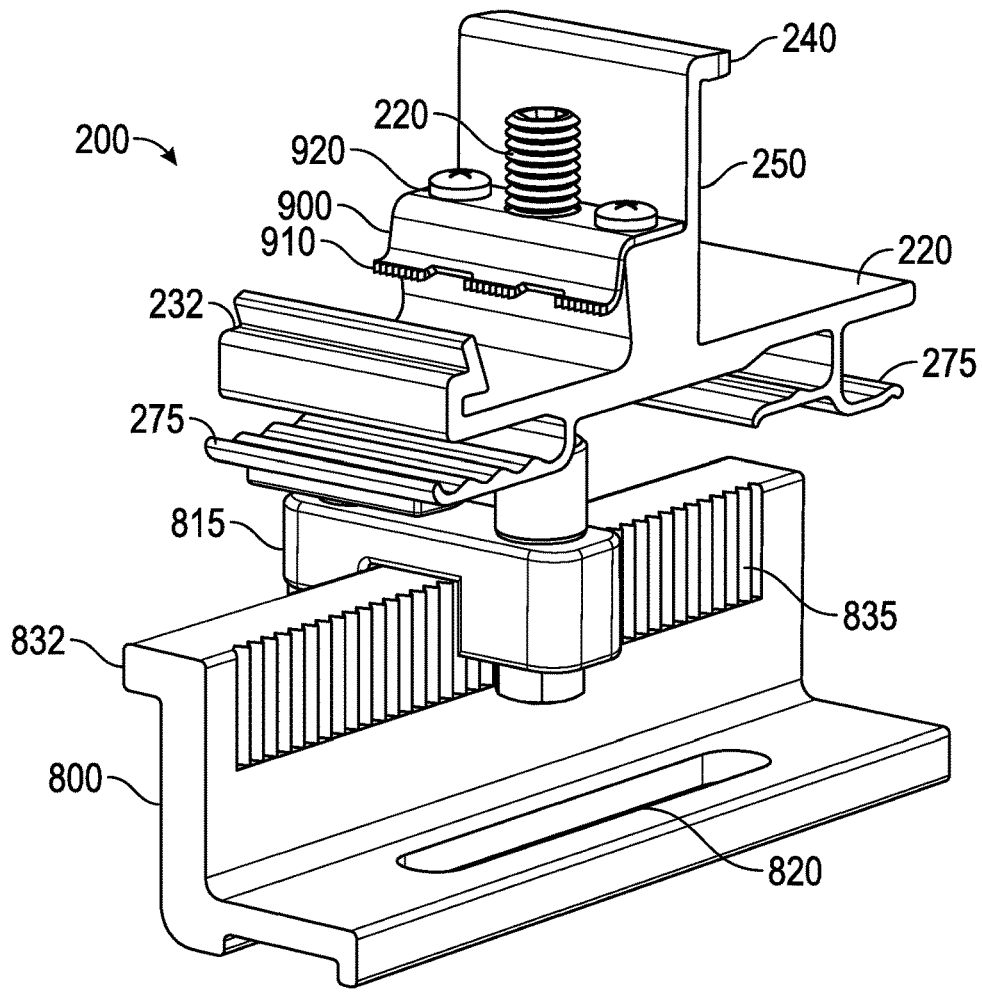
FIG. 48 illustrates a front perspective view of an assembly that utilizes an alternate exemplary embodiment of the assembly shown in FIG. 42.
Figure 49:
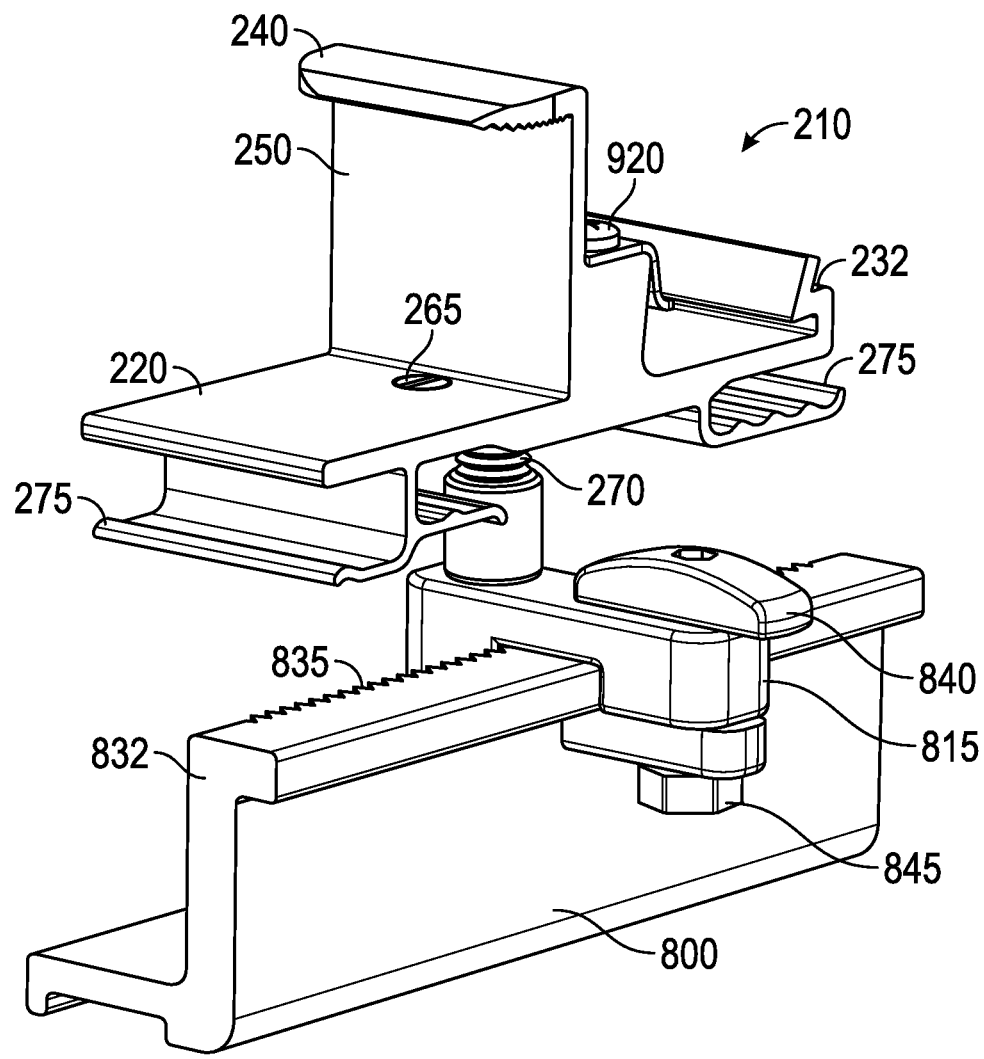
FIG. 49 illustrates a rear perspective view of the exemplary embodiment as shown in FIG. 48.

FIGS. 48-51 show an alternate exemplary embodiment of an assembly 200. FIG. 48 shows a perspective view of the assembly 200. The assembly includes the slot 820, a top guide 832 along with the leveling bolt mount 810. In this embodiment, the top guide 832 includes a series of ridges 835 that are utilized for providing unique position points for the leveling bolt mount to be secured to the top guide 830. FIG. 49 illustrates the rear perspective view of the assembly 200 as shown in FIG. 48. The leveling bolt mount 810 has a rail cam lock 840 that is pivotally connected to the leveling bolt mount 815 with a nut 845. The cam lock 840 can rotate between an open and closed position. When the cam lock 840 is in the open position, the leveling bolt mount 815 moves linearly along the guide 830. When the cam lock 840 is in the closed position as shown in FIG. 49, the leveling bolt mount 815 is secured to the guide 830 at a given position. As shown in FIGS. 48 and 49, the clamp 210 includes conduits 275 as used in other embodiments previously discussed. The conduits 275 are utilized for storing wires used for the installation of the array 100. The clamp 210 is pivotally connected to the leveling bolt mount 815 by way of the leveling bolt 270.

An alternate spring lock embodiment 900 is shown secured to the south side of the mounting plate 220 as shown. The spring lock 900 is an electrically conductive resilient sheet that is secured to the middle portion of the mounting plate 220 by way of a pair of screws 920 or any other suitable means for securing the spring lock 900. The exemplary spring lock 900 also includes a plurality of raised portions 910 on an end as shown in FIG. 48. When an array skirt 140 or solar panel module 500 is rotated into position as shown in FIGS. 45 and 46, the raised portions 910 engage the rear 142 of the array skirt 140 or the solar panel module 500 and cause the spring lock 900 to bend downward. This causes penetration of their outer surface layers, which in turn creates an electrical path from the skirt 140 or the solar panel module 500 and the pivot rail 800, which also in turn electrically bonds the array 100. As shown in FIG. 49, instead of utilizing a spring lock 900, a bonding pin 265 is secured to the north side of the mounting plate 220. The bonding pin 265 includes the same features those in previous embodiments like the ones in FIGS. 12 and 13. The pin 265 includes a raised portion that is used to penetrate the outer surface layer of the solar panel module 500.

Figure 50:
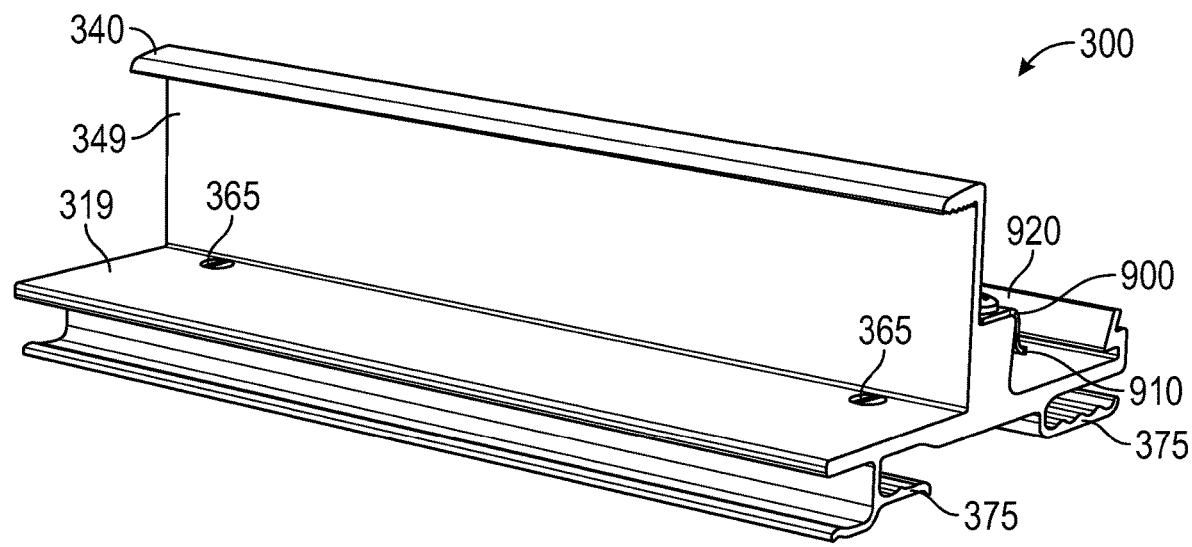
FIG. 50 illustrates a rear perspective view of an alternate exemplary embodiment of a splice.
Figure 51:
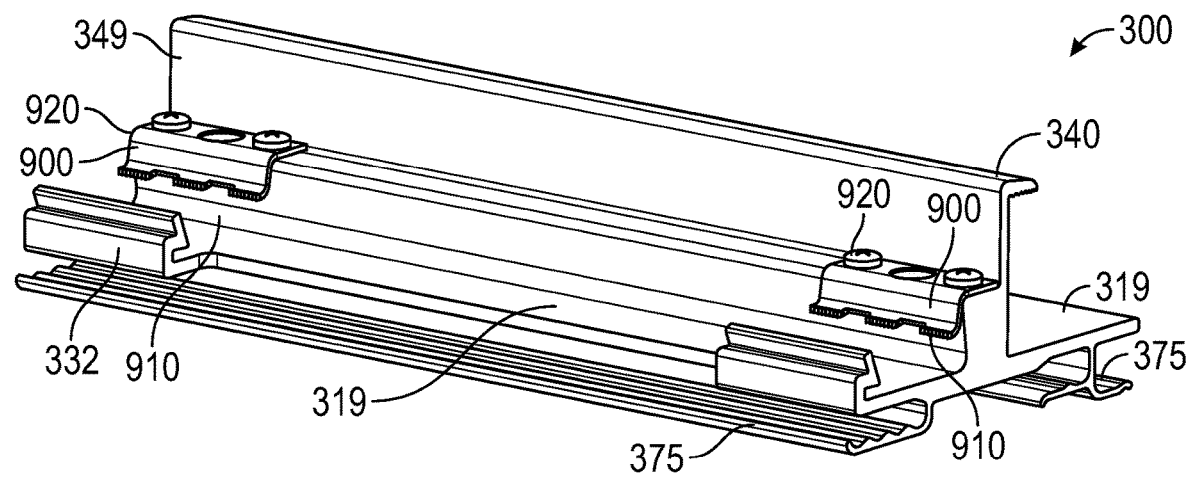
FIG. 51 illustrates a front perspective view of the embodiment of the splice as shown in FIG. 50.

FIGS. 50 and 51 illustrate an alternate exemplary embodiment of a splice 300. FIG. 51 shows the splice 300 includes the pair of spring locks 900 installed on the south side of the mounting plate 319. The spring locks 900 are secured to opposite ends of the splice 300 with the screws 920. As with the spring locks 900 used with the clamp 210 in FIG. 49, each of them further comprises raised portions 910 capable of penetrating an outer surface layer of the solar panel module 500 or array skirt 140. The splice 300 is assembled in the same manner to that of the clamp 210 shown in FIGS. 45-47. Likewise, as shown in FIG. 50, a pair of grounding pins 365 is installed on opposite ends of the north side of the mounting plates 319. A pair of solar panel modules 500 are joined on the north side of the mounting plate 319 and installed so that the raised portions of the grounding pins 365 penetrate the outer surface layers of the solar panel modules 500. The splice 300 also includes conduits 375 beneath the length of the splice 300 to store and manage wires used in the installation of the array 100.

Figure 52:
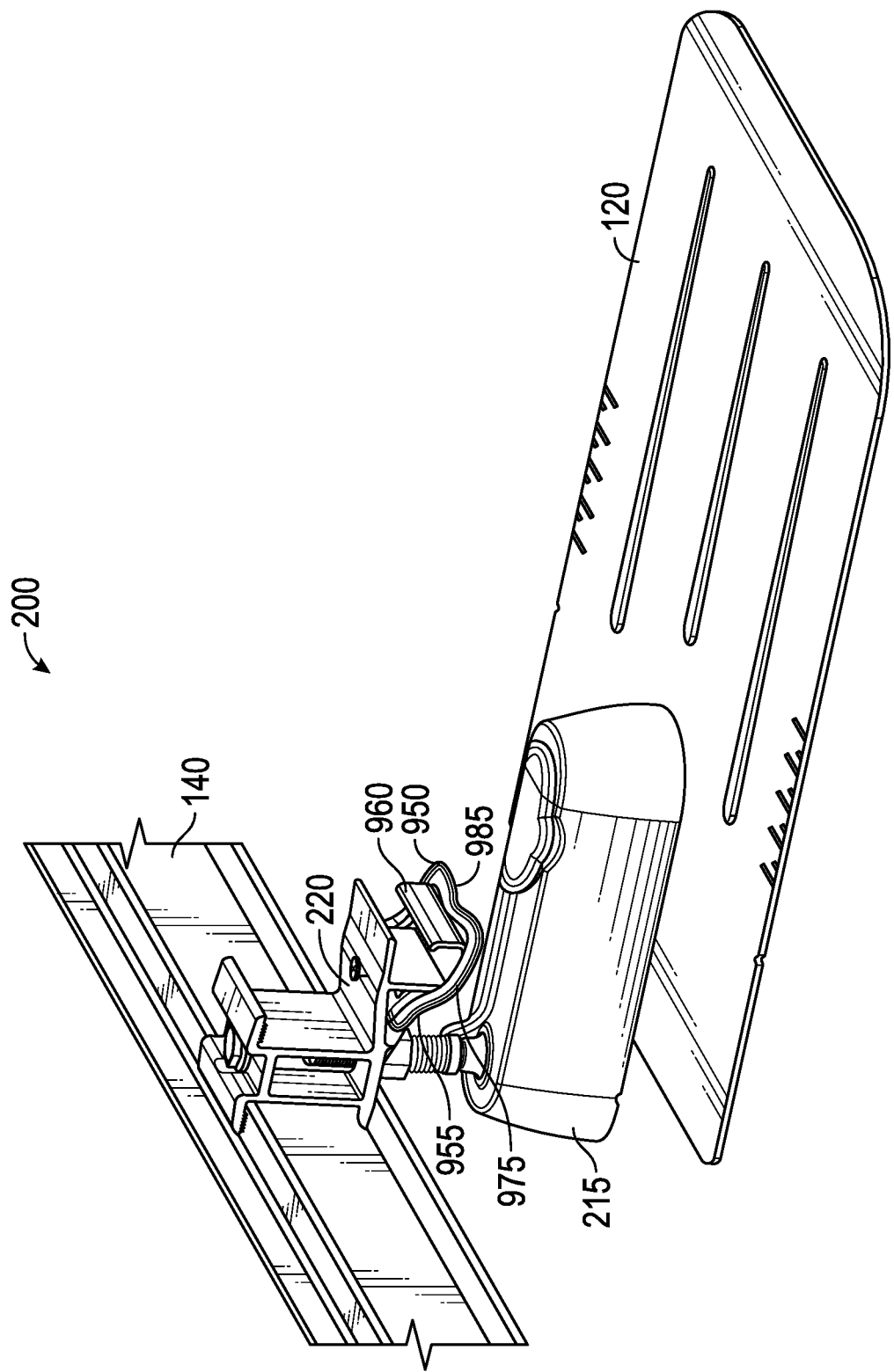
FIG. 52 illustrates a perspective view of the assembly showing an alternate embodiment of the wire management system.
Figure 53:
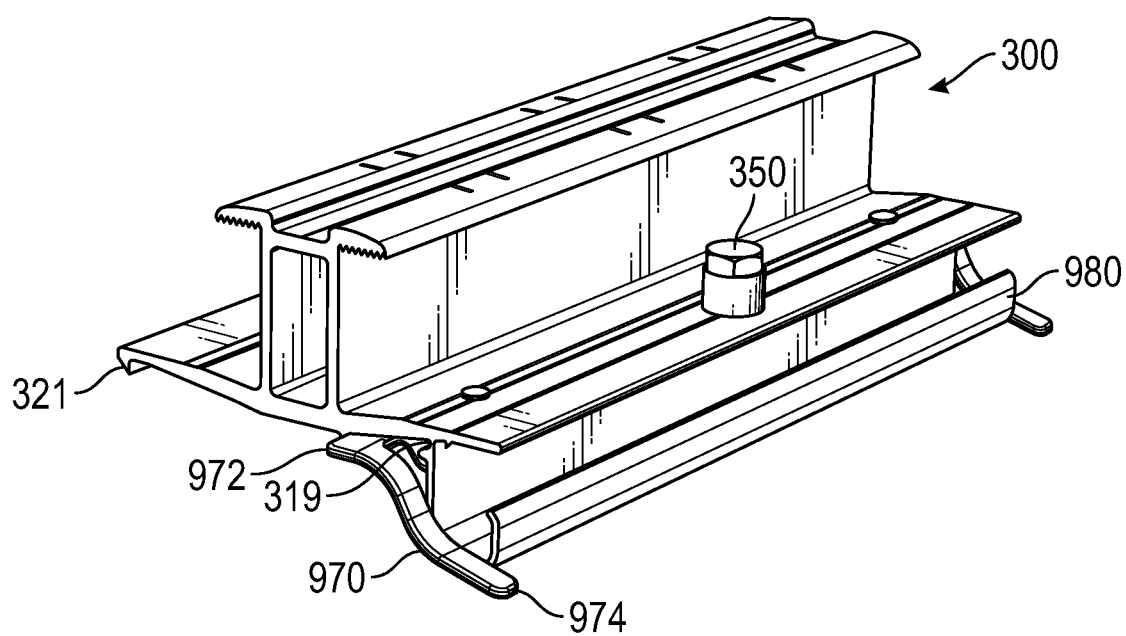
FIG. 53 illustrates a perspective view of an alternate embodiment of a splice utilizing the alternate embodiment of the wire management system and other features.
Figure 54:
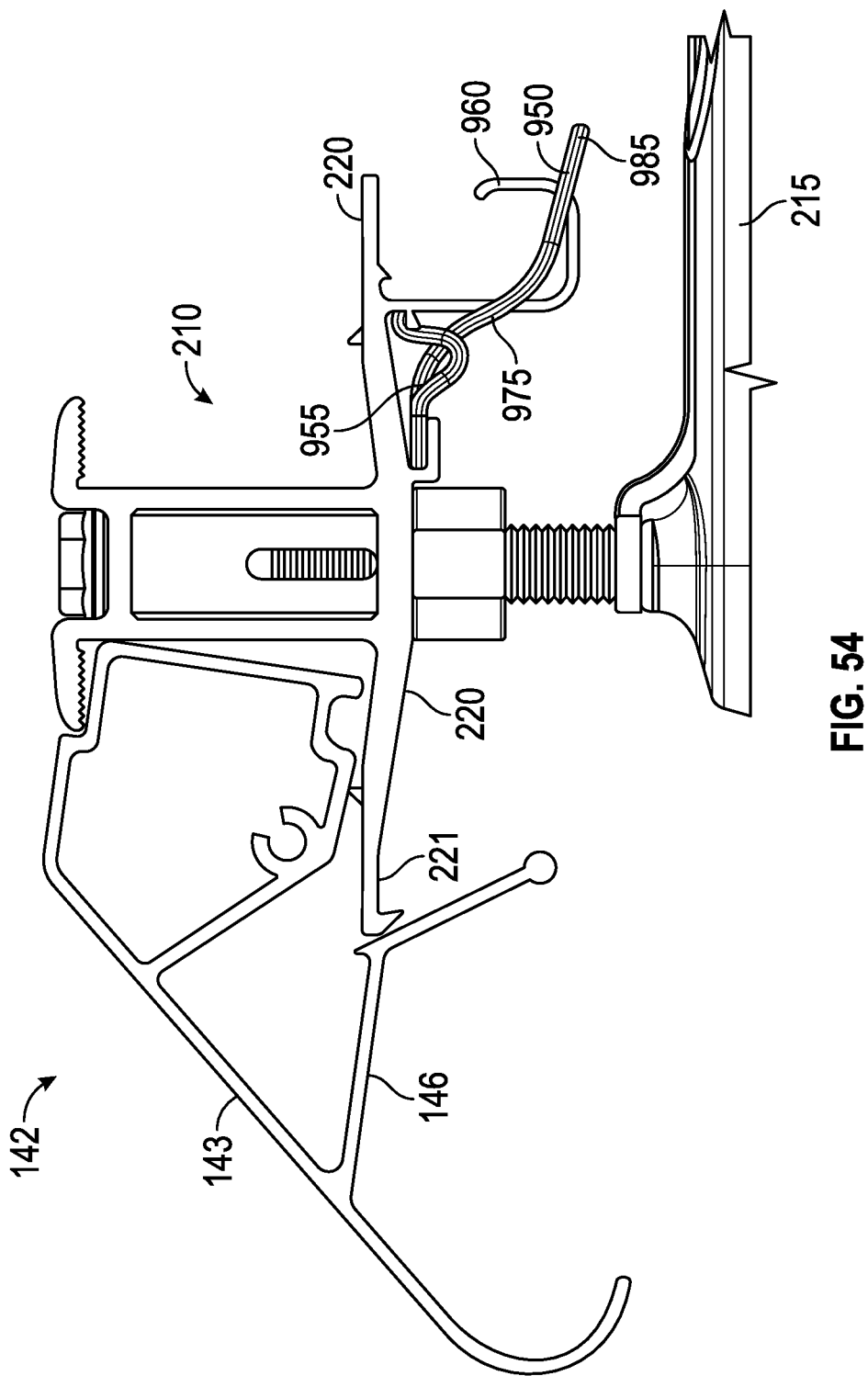
FIG. 54 illustrates a side view of the embodiment shown in FIG. 52 along with an alternate exemplary embodiment of an array skirt.

FIGS. 52-54 show an assembly 200 utilizing an alternate exemplary embodiment of the wire management system. Wires that are used as part of the solar panel array 100 can, and often do, appear in bundles or harnesses. In order to preserve the electrical integrity of the solar panel installation, the wires often need to be properly placed and cared for to preserve the electrical integrity of the array and the wires themselves. FIG. 52 is a perspective view of the assembly 200 and FIG. 54 shows a side view of the assembly 200 showing the wire management system as provided in FIG. 52.

With particular emphasis on the wire management elements, a conduit 960 is provided. The conduit 960 is generally j-shaped and is connected to the bottom side of the mounting plate 220. The conduit 960 extends along a portion of the length of the mounting plate 220, but it is understood that generally the conduit 960 extends the entire length. A tab 950 is coupled to the bottom portion of the assembly 200. The tab 950 is typically secured to the assembly 200 at one end 955 beneath the mounting plate 220 and is made of a resilient material to allow it to flex upward in a spring-like fashion on its opposite end and return to its normal position. The tab 950 generally extends the length of the conduit 960 such that when the tab 950 is lifted upward, a length of wire can be placed in into the conduit 960 beneath the tab 950 so that when the tab 950 is released, the resiliency of the tab 950 presses downward on top of the wire outside of the conduit 960 and secures the wire within the conduit 960. It is also understood that the tab 950 can be secured at one end 955 in other locations on the assembly 200 as long as the tab 950 can secure wires in the conduit 960 as described above.

It is also understood by one of ordinary skill that the tab 950 can have varying forms. As shown in FIG. 52, the tab 950 can surround the outer perimeter of the conduit 960 so that a pair of sides 975 and an outer length 985 form the shape of the tab 950.

FIG. 53 shows a perspective view of an alternate embodiment of the splice 300. As shown in FIG. 53, the tab 950 can also comprise of a single side 970. Although it is understood that a single tab 970 could secure wires within the conduit 960 (or 980 as shown in FIG. 53), utilizing a tab 950 or 970 that provides security to both sides of the conduit 960 or 980 would provide greater security to wires within the conduit 960. The tab 970, as shown in FIG. 53, is coupled to the splice 300 at one end 972 and can be operated by lifting the opposite end 974 in the same manner as the tab 950 in FIGS. 52 and 54. The splice 300 also includes a spacer or separator 350. The separator 350 enables two solar panels 500 or array skirts 140 to have a space between them when joined together in a parallel arrangement so that the solar panels extend outwardly in the same direction. The separator 350 in this embodiment is cylindrically shaped, but it can be of any suitable shape that allows it to fit in the middle portion of the splice 300 and maintain parallel separation between the solar panel modules 500. The splice 300 also includes a hook 321 on the south side of the mounting plate 320. This enables a pair of array skirts 142 as shown in FIG. 54 to be joined on the splice 300 as shown in FIG. 53.

In the previous description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described above.

What is claimed is:

1. A wire management system for solar panel arrays comprising:
   a. a solar panel mounting assembly;
   b. a conduit further comprising an opening wherein the conduit is coupled to, and extends beneath a length of the solar panel mounting assembly; and
   c. a tab further comprising a first end, a pair of sides that extend to a second end, and an outer length extending between the pair of sides proximate the second end such that:
      i. the first end of the tab is pivotally coupled to the solar panel mounting assembly, and
      ii. the first end, the pair of sides, and the outer length of the tab surround an outer perimeter of the conduit.

2. The wire management system of claim 1 wherein the tab is resilient such that when the tab is moved upward from a first position and subsequently released, the tab returns to the first position.

3. The wire management system of claim 1 further comprising at least one wire wherein the tab is resilient and is configured to engage and secure the at least one wire within the conduit by applying downward pressure on the at least one wire when the tab is moved upward from a first position and subsequently released.

4. The wire management system of claim 2 such that when the tab is moved upward from a first position the conduit passes within the perimeter of the tab.

\* \* \* \* \*